United States Patent

Sakagami et al.

[11] Patent Number: 5,554,978
[45] Date of Patent: Sep. 10, 1996

[54] AUTOMOBILE MULTIPLE COMMUNICATION SYSTEM OPERABLE UNDER LOW POWER CONSUMPTION

[75] Inventors: Atsushi Sakagami, Yokohama; Tatsuya Sekido, Zama; Isao Yamamoto; Yuko Echigo, both of Sagamihara, all of Japan

[73] Assignee: Nissan Motor Co., Ltd., Yokohama, Japan

[21] Appl. No.: 20,115

[22] Filed: Feb. 19, 1993

[30] Foreign Application Priority Data

Feb. 21, 1992 [JP] Japan ................................. 4-035314

[51] Int. Cl.[6] .............................. G05B 23/02; H04S 3/14; H04L 11/00
[52] U.S. Cl. ............................. 340/825.07; 340/825.12; 370/85.1
[58] Field of Search ...................... 340/825.07, 825.06, 340/825.08, 825.09, 825.21, 825.51, 825.52, 825.11, 825.12, 825.13; 370/85.1, 95.1

[56] References Cited

U.S. PATENT DOCUMENTS

| | | | |
|---|---|---|---|
| 4,155,075 | 5/1979 | Weckenmann et al. | 340/825.07 |
| 4,628,308 | 12/1986 | Robert | 340/825.08 |
| 5,121,386 | 6/1992 | Wolfsgruber et al. | 370/85.1 |
| 5,161,151 | 11/1992 | Kimura et al. | 340/825.08 |

FOREIGN PATENT DOCUMENTS 3-25046  2/1991  Japan .

Primary Examiner—Alyssa H. Bowler
Assistant Examiner—Mark H. Rinehart
Attorney, Agent, or Firm—Foley & Lardner

[57] ABSTRACT

A multiplex communication system for an automobile which achieves low-power-consumption operation of a plurality of child stations. The system includes a parent station having a judging element to judge whether a communication mode of the system corresponds to one of a normal communication mode and a low-power-consumption mode; at least a child station having a detection unit for detecting that the supply of power to the child station has commenced to produce a power-supply detection signal, and a compulsory condition changing unit for changing a present operation condition of the child station to a low-power-consumption state in response to the power-supply detection signal; and a communication line for connecting the parent station and the child station. In the disclosed embodiment, the judging unit judges that the present communication mode corresponds to the normal communication mode and sets operation conditions of the child station and the parent station to normal operation conditions so as to perform a communication between the child station and the parent station. Alternatively, the judging unit judges that the present communication mode corresponds to the low-power-consumption communication mode and sets operation conditions of the child station to a low-power-consumption operation condition.

14 Claims, 14 Drawing Sheets

FIG.9
PRIOR ART
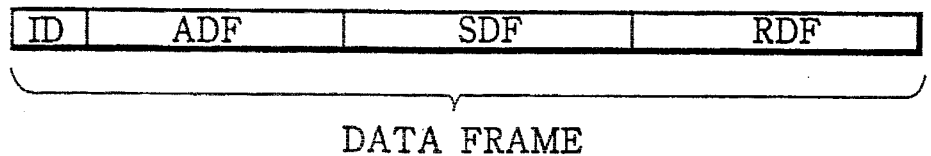
DATA FRAME
FIG.10
PRIOR ART
DESTINATION ADDRESS FIELD "ADF"
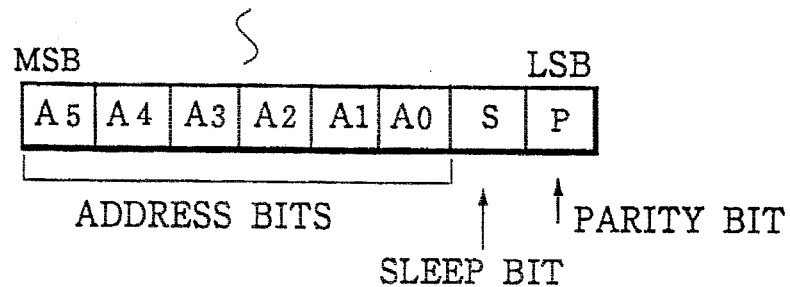
FIG.11A PRIOR ART "0"-CODE
FIG.11B PRIOR ART "1"-CODE
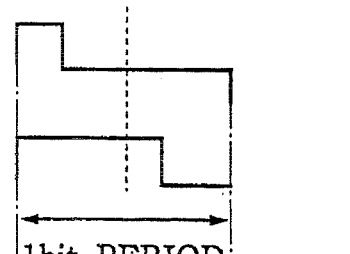
FIG.11C PRIOR ART SLEEP-RELEASE SIGNAL
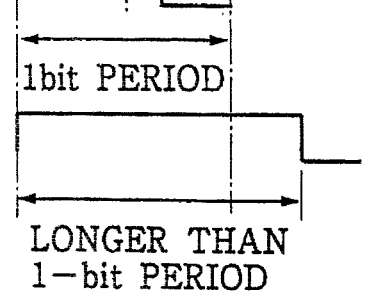

NON-INPUT-SIGNAL CONDITION DETECTING CIRCUIT 59

FIG.16A
SLEEP-RELEASE SIGNAL MONITORING CIRCUIT 63
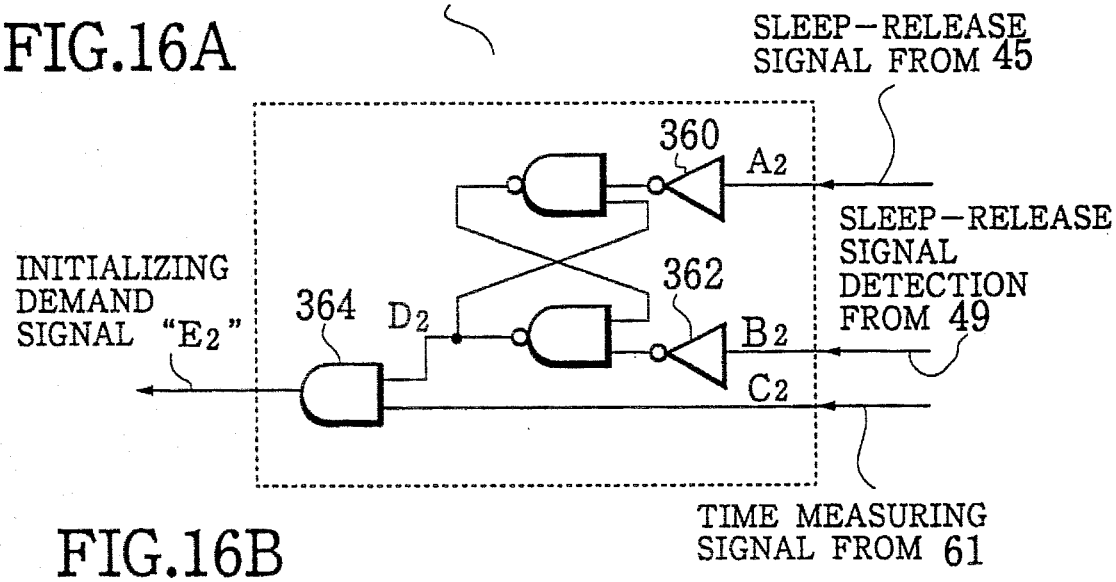
FIG.16B
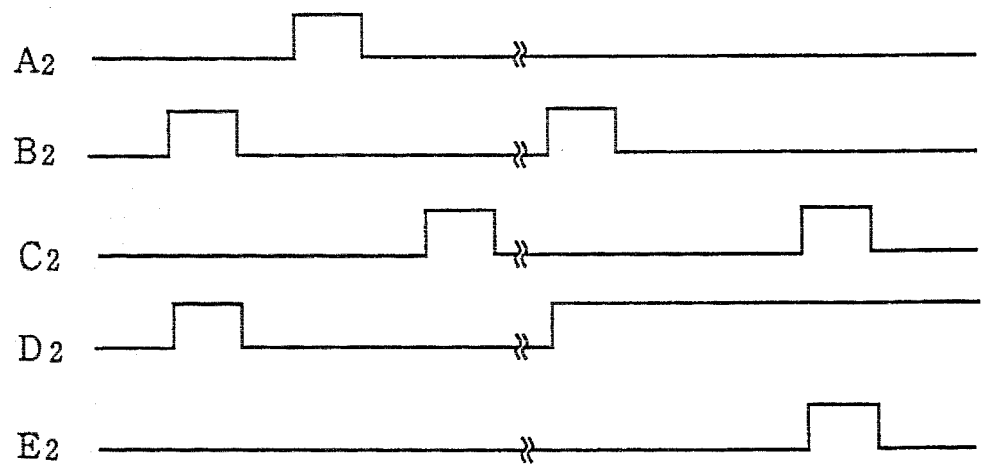
FIG.16C
| A2 | B2 | C2 | D2 | E2 |
|----|----|----|----|----|
| 0  | 0  | 0  | ×  | 0  |
| 1  | 0  | 0  | 0  | 0  |
| 0  | 1  | 0  | 1  | 0  |
| 1  | 1  | 0  | 1  | 0  |
| 0  | 0  | 1  | ×  | ×  |
| 1  | 0  | 1  | 0  | 0  |
| 0  | 1  | 1  | 1  | 1  |
| 1  | 1  | 1  | 1  | 1  |
×: DON'T CARE

POWER-VOLTAGE DETECTOR 34

AUTOMOBILE MULTIPLE COMMUNICATION SYSTEM OPERABLE UNDER LOW POWER CONSUMPTION

BACKGROUND OF THE INVENTION

1. Field of the Invention

The present invention generally relates to a multiple data communication system used in an automobile. More specifically, the present invention is directed to an automobile multiple communication system employing a parent station and a plurality of child stations, capable of preventing power consumption such as a dark current of a battery in these child stations.

2. Description of the Prior Art

Recently, various electronic components such as speed sensors and touch switch sensors have been normally utilized in automobiles. Under such circumstances, an amount of connecting wires, i.e., wire harness for electrically connecting a large number of terminal units with a large quantity of input units is considerably increased, as compared with that of the old-fashioned automobiles. The terminal units are, for instance, headlights, sidemarker lamps and actuators, whereas the input units are, for example, switches and sensors. Since the total amount of the wire harness is considerably increased, there are problems that the total weight of the automobile is increased and reliabilities of these unit assemblies are deteriorated.

To solve the above-described problems, various types of multiplex communication systems have been developed, by which various information about drive controls for a large quantity of terminal units can be firmly transferred via a small number of connecting wires to the input units.

In one conventional multiplex communication system, there are provided child stations at the terminal side, to which a plurality of terminal units are connected, and also a parent station at the input side, to which a plurality of input units are connected. These plural child stations and parent station are mutually connected via a common communication line. Then, the operation data about the input units are acquired and the relevant terminal unit can be driven by performing the multiplex data communication operation under control of the communication control microcomputers employed in these child stations and parent stations. Such a conventional multiplex communication system for automobiles is described in, for instance, Japanese Laid-open (KOKAI DISCLOSURE) Patent Application No. 3-25046 opened on Feb. 1, 1992.

In accordance with this conventional multiplex automobile communication system, the parent station judges whether the present communication mode corresponds to the normal communication mode, or the low-power-consumption communication mode. In the normal communication mode, the ignition switch is turned ON, whereas in the low-power-consumption communication mode, the ignition switch is turned OFF. When the parent station judges that the present communication mode is "the normal communication mode", these child stations are set to the normal operation conditions (will be referred to as "wake conditions"), and subsequently acquire various information derived from the child stations, and furthermore controls the child stations based upon the acquired information. To the contrary, when the parent station judges that the present communication mode is the low-power-consumption mode, the parent station sends information for instructing the low power consumption operation (will be referred to as "sleep operation") to the child station. As a result, after the respective child stations have been set to the low-power-consumption conditions (will be referred to as "sleep conditions") by the parent station, this parent station itself is brought into the "sleep" condition.

It should be noted in this conventional multiplex communication system that when all of the child stations are turned ON, namely electrically connected to the battery, these child stations start their own operations under the "wake" conditions. Also, only when the respective child stations receive the sleep instruction signals issued from the parent station, are these child stations brought into the "sleep" conditions.

In the above-described conventional automobile multiplex communication system, if the power supply to the child station would be instantaneously interrupted, or the DC voltage of the power source (battery) would be varied due to a loose contact occurring in the power supply lines connected between the power source and the child stations operated, under sleep conditions, then the sleep conditions of the child stations would be mistakenly changed into the wake conditions, which is similar to such a condition that the child station is powered by the power source. If such wake conditions of the child stations are continued for a long time, then large consuming currents flow through the child stations. As a consequence, there is another problem that the power of the battery becomes highly consumed.

Furthermore, if the communication control microcomputer employed in the parent station would be operated under an extraordinary state, even when various information is transmitted from the child stations to this parent station, there are some risks that the information from the child stations could not be acquired by the parent station.

SUMMARY OF THE INVENTION

The present invention has been made in an attempt to solve the above-described problems, and therefore, an object is to provide an automobile multiplex communication system capable of realizing low power consumption within child stations.

Another object of the present invention is to provide an automobile multiplex communication system capable of firmly acquiring various information issued from child stations by parent stations.

To achieve these objects and other features, an automobile multiple communication system (100), according to one aspect of the present invention comprises:

a parent station (PS) having at least judging means (48) for judging whether or not a present communication mode of said multiplex communication system (100) corresponds to one of a normal communication mode and a low-power-consumption mode;

at least one child station (CS) including:

detection means (1:34) for detecting that a supply of power to said child station (CS) is commenced, thereby producing a power-supply detection signal, and compulsorily condition changing means (3) for compulsorily changing a present operation condition of said child station (CS) into a low-power-consumption operation condition in response to said power-supply detection signal; and a communication line (LL) for mutually connecting said parent station (PS) and said child station (CS), whereby when said judging means (43) judges that the present communication mode of the multiplex communication system (100) corresponds to said normal communication mode, said judging means (43) sets operation conditions of said child station (CS) and said parent station (PS) to normal operation conditions so as to perform a communication between said child station (CS) and said parent station (PS), and when said judging means (43) judges that the present communication mode of the multiplex communication system (100) corresponds to said low-power-consumption communication mode, said judging means (43) transmits to said child station (CS), an instruction for changing the present operation condition of said child station (CS) into the low-power-consumption operation condition, thereby bringing both of said child station (CS) and said parent station (PS) into the low-power-consumption operations in addition to said compulsorily condition changing operation by said compulsorily condition changing means (3).

Further, according to another aspect of the present invention, a multiplex communication system (200) used in an automobile, comprises:

a parent station (PS) having at least judging means (43) for judging whether or not a present communication mode of said multiplex communication system (200) corresponds to one of a normal communication mode and a low-power-consumption communication mode;

at least one child station (CS) including:

first detection means (5:59) for detecting that an operation condition of said child station (CS) corresponds to an normal operation condition to produce a first detection signal, and second detection means (7:59) for detecting that no input signal is supplied to said child station (CS) to produce a second detection signal; and condition changing means (9) for changing a low-power-consumption operation condition of said parent station (PS) into a normal operation condition thereof based upon both of said first detection signal and said second detection signal when said child station (CS) is operated under the normal operation condition and further said no input signal is supplied to said child station (CS); and a communication line (LL) for mutually connecting said parent station (PS) and said child station (CS) to establish a communication.

Also, according to a further aspect of the present invention, a multiplex communication system (300) used in an automobile, comprises:

a plurality of child stations ($CS_n$, "n" being an integer) coupled to an input unit (IN) and terminal units ($TL_n$), each including at least release-signal producing means (11) for producing a first release signal when said child station detects a change in conditions of said input unit (IN) coupled thereto under a low-power-consumption condition of said child station;

a parent station (PS) connected to said plurality of child stations ($CS_n$) via a common communication line (LL), including at least:

release-signal detecting means (13) for detecting whether or not said first release signal is issued from said first release signal producing means (11) of said child station to derive a release-signal detection signal, said first release signal causing a low-power-consumption operation condition of said parent station (PS) to be changed into a normal operation condition;

time measuring means (15) for measuring an elapse of time upon receipt of said release-signal detection signal to define a predetermined time period;

judging means (17) for judging whether or not a second release signal has been produced within said predetermined time period, said second release signal causing a low-power-consumption operation of said child station (CS) to be changed into a normal operation condition; and initializing means (19) for compulsorily initializing said parent station (PS) when no said second release signal is produced, whereby said parent station (PS) judges whether or not a present communication mode of said multiplex-communication system (300) corresponds to one of a normal communication mode and a low-power-consumption communication mode; whereby in case of said normal communication mode, said parent station (PS) brings both of said child stations ($CS_n$) and said own parent station (PS) into the normal operation conditions, thereby establishing communications among said parent and child stations, detecting the conditions of said input unit, and controlling said terminal units in response to the detected conditions of said input unit; and also in case of the low-power-consumption communication mode, said parent station (PS) transmits an instruction for instructing said child stations to be brought into the low-power-consumption operations and furthermore causes said own parent station (PS) to be brought into the low-power-consumption operations.

BRIEF DESCRIPTION OF THE DRAWINGS

FIG. 9 to FIGS. 11A–11C represent a data frame format and code signals;

FIG. 16A shows an internal circuit diagram of the sleep-release signal monitoring circuit 63 employed in the third automatic multiplex communication system 300;

FIG. 16B shows a waveform chart for various signals appearing in the sleep-release signal monitoring circuit 63;

FIG. 16C shows a truth table for the sleep-release signal monitoring circuit 63;

DETAILED DESCRIPTION OF THE REFERRED EMBODIMENTS

BASIC IDEAS

Before describing various preferred embodiments of the present invention, basic ideas of the present invention will now be summarized.

Figure 1:
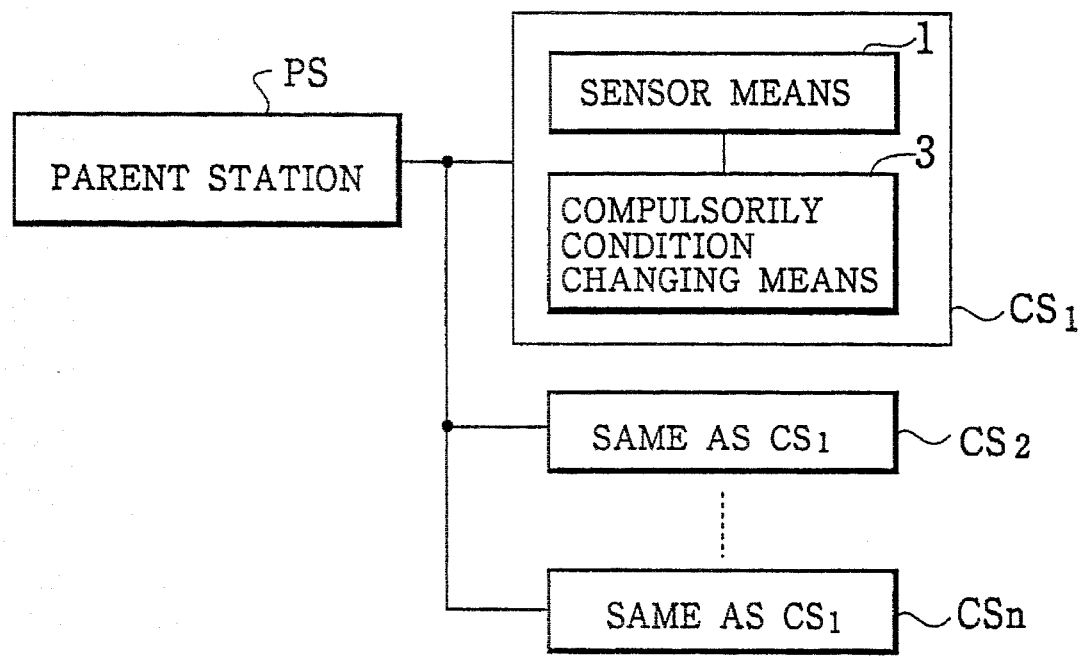
FIG. 1 schematically illustrates a first basic idea of the automobile multiplex communication system according to the present invention.

FIG. 1 schematically shows an arrangement of a multiplex communication system for an automobile, according to a first basic idea of the present invention.

The first automobile multiplex communication system shown in FIG. 1 is mainly constructed of one parent station "PS" and a plurality of child stations $CS_1$, $CS_2$, - - - , $CS_n$ ("n" being an integer), which are connected to this parent station "PS". Because the child stations $CS_1$, $CS_2$, - - - , $CS_n$ are the same, a child station will be referred to generically as CS. In each of the plurality of child stations $CS_1$, $CS_2$, - - - $CS_n$, there are provided a sensor means 1 and a compulsorily condition changing means 3.

The parent station PS has at least one function to judge whether the present communication mode corresponds to the normal communication mode (namely, high power consumption), or the low-power-consumption communication mode. In case of the normal communication mode judged by the parent station PS, the parent station PS sets herself PS and also these child stations $CS_1$, $CS_2$, - - - , $CS_n$ to the normal operation conditions ("wake" conditions), and then establishes communications among these stations PS, CS. To the contrary, when the parent station PS judges that the present communication mode corresponds to the low-power-consumption communication mode, this parent station PS transmits instruction information for instructing an operation change into the low consumption power operation to the child stations $CS_1$, $CS_2$, - - - , $CS_n$, so that the respective child stations are set to the low power consumption conditions (namely, sleep conditions). Thereafter, this parent station PS per se is similarly brought into the "sleep" condition.

In the respective child stations $CS_1$, $CS_2$, - - - , $CS_n$, the sensor means 1 senses that a power supply to the relevant child station is commenced. When the commencement of the power supply is sensed by this sensor means 1, the compulsorily condition changing means 8 compulsorily changes the present operation condition of the relevant child station CS into the low power consumption condition.

In accordance with the feature of the first automobile multiplex communication system shown in FIG. 1, the following merit is obtained. That is, when the power supply to the child station CS is instantaneously interrupted and thereafter the normal power supply to child station CS is recovered, this condition is similar to such a condition that the power supply to the child station is commenced. As a result, after the instantaneous power interruption, the child station CS is compulsorily brought into the sleep condition, namely low-power-consumption operating condition.

Figure 2:
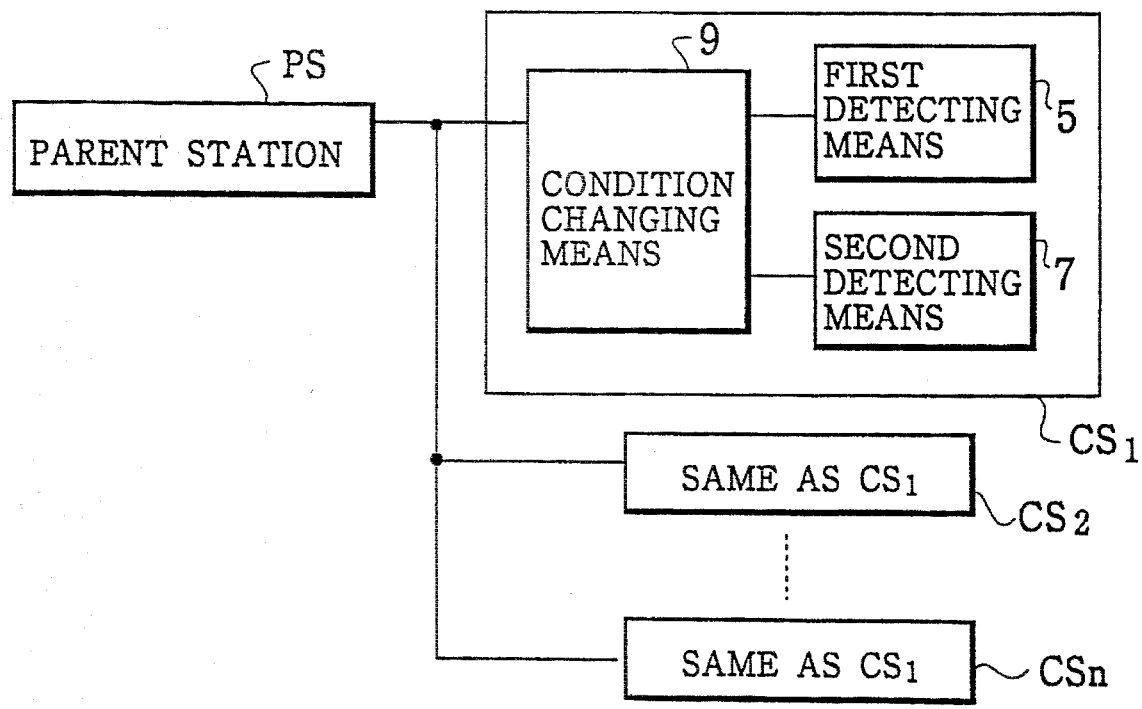
FIG. 2 schematically represents a second basic idea of the automobile multiplex communication system according to the present invention.

FIG. 2 schematically illustrates an arrangement of a multiplex communication system for an automobile, according to a second basic idea of the present invention.

Similar to the first automobile multiplex communication system shown in FIG. 1, this second automobile multiplex communication system is mainly arranged by one parent station PS and a plurality of child stations $CS_1$, $CS_2$, - - - , $CS_n$. In the respective child stations $CS_1$, $CS_2$, - - - , CSn, there are employed a first detecting means 5, a second detecting means 7, and a condition changing means 9. The first detecting means 5 detects that the present operation condition of the relevant child station CS corresponds to the normal operation condition (namely, "wake" condition), whereas the second detecting means 7 detects such a condition of the relevant child station CS that no input signal is applied. The condition changing means 9 changes the low-power-consumption operation (sleep) condition of the parent station PS into the normal-power-consumption operation (wake) condition by checking the detection results of the first and second detecting means 5 and 7 under such conditions that the child station CS is under the normal operation condition and no input signal is supplied to this child station CS.

In the second automobile multiplex communication system shown in FIG. 2, when the parent station PS judges that the present communication mode corresponds to the normal communication mode, this parent station PS sets herself PS and the child stations $CS_1$, $CS_2$, - - - , $CS_n$ to the normal operation conditions ("wake" conditions), so that the communications are carried out among the parent station PS and the child stations CS. To the contrary, when the parent station PS judges that the present communication mode corresponds to the low-power-consumption communication mode, the parent station PS sends instruction information for instructing the execution of the low power consumption operation so as to set the operation conditions of the respective child stations CS to the low power consumption conditions. Subsequently, the own operation condition of the parent station PS is also changed into the low-power-consumption operation condition.

Then, when the operation conditions of the child stations CS are under the normal operation conditions and also no input signals are supplied to the child stations CS, the parent station PS judges based upon the detection results of the first detecting means 5 and the second detecting means 7 that the present operation condition corresponds to the low-power-consumption operating condition. As a result, the operation condition of the parent station PS is changed from the low-power-consumption operating condition into the normal operation condition.

Under such circumstances, in case of the low-power-consumption communication mode, namely in case that both of the parent station PS and the child stations CS are under the low-power consumption operating conditions, if only the operation condition of the relevant child station CS is recovered to the normal operation condition due to the fact that the power supply to the child station is instantaneously interrupted, the operation condition of the parent station PS is also changed into the normal operation condition. Subsequently, in order to detect that the present communication mode of the parent station PS corresponds to the low-power-consumption communication mode, after the operation conditions of the respective child stations are again changed into the low-power-consumption operating conditions, the parent station PS causes her operation condition into the low-power-consumption operating condition.

Figure 3:
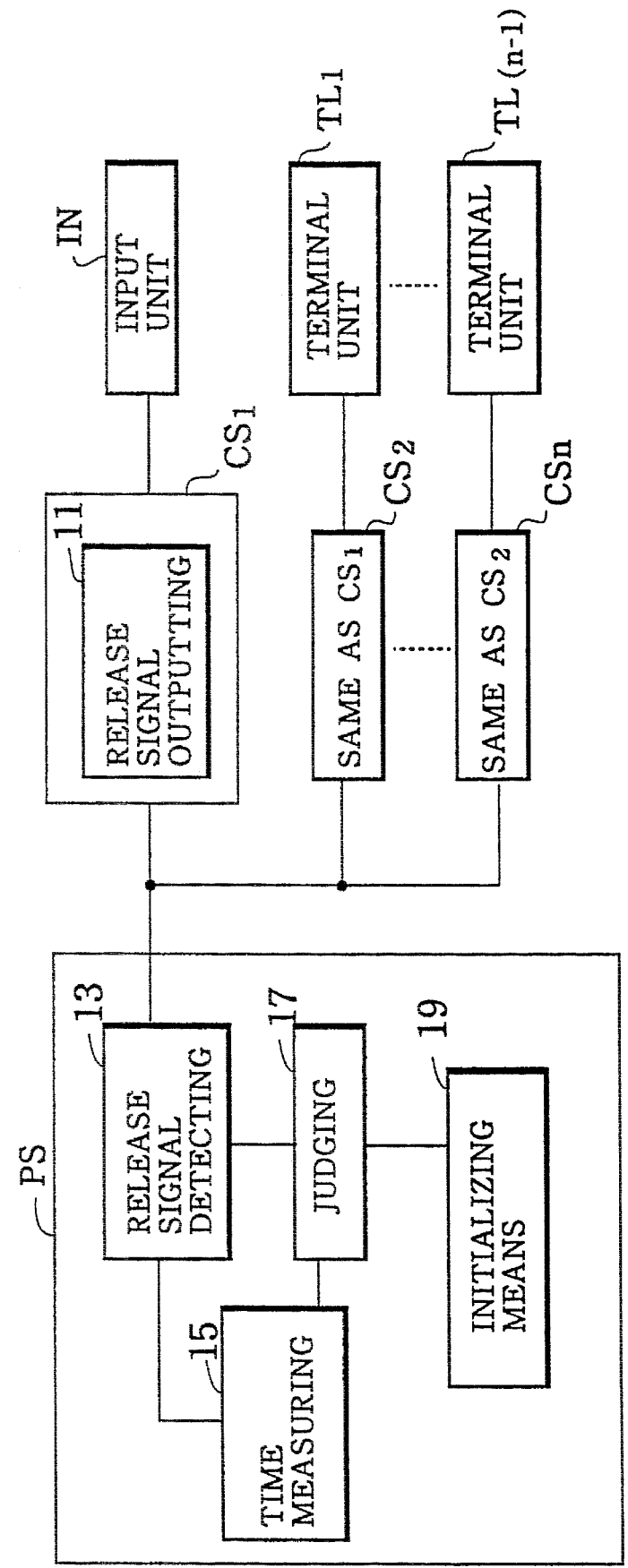
FIG. 3 schematically shows a third basic idea of the automobile multiplex communication system according to the present invention.

FIG. 3 schematically illustrates an arrangement of a multiple communication system for an automobile, according to a third basic idea of the present invention.

As represented in FIG. 3, the third automobile multiple communication system is arranged by a parent station "PS", a plurality of child stations $CS_1$, $CS_2$, - - - , $CS_n$, an input unit IN, and also terminal units $TL_1$, - - - , $TL_{(n-1)}$. Each of the child stations $CS_1$, $CS_2$, - - - , $CS_n$ includes a release signal output means 11. The release signal outputting means 11 outputs a first release signal by which an operation condition of the parent station PS is changed from the low-power-consumption operation condition into the normal operation condition. The parent station PS includes a release signal detecting means 13 for detecting the first release signal issued from the release signal outputting means 11, a time measuring means 15 for measuring a time period upon receipt of the first release signal, and a judging means 17 for judging whether or not a second release signal is produced within a time period measured by the time measuring means 15. This second release signal causes the operation condition of the relevant child station CS to be changed from the low-power-consumption operation condition into the normal operation condition. The parent station further includes an initializing means 19 for compulsorily initializing the parent station per se when the judging means 17 judges that no second release signal is not produced.

In the third automobile multiplex communication system, the parent station PS judges whether the present operation mode corresponds to the normal communication mode, or the low-power-consumption communication mode. When the parent station PS judges that the present communication mode corresponds to the normal communication mode, the operation conditions of these child stations CS and the parent station PS are set to the normal operation modes, so that various communications are established among the parent station PS and the child stations CS. Furthermore, the parent station PS detects the condition of the input unit IN, and controls the terminal unit TL corresponding to the input unit IN based on the judged condition of the input unit IN. To the contrary, when the parent station PS judges that the present communication mode corresponds to the low-power-consumption communication mode, this parent station PS sends an instruction to the respective child stations CS in order that the operation conditions of the child stations CS are set to the low-power-consumption operation conditions. Thereafter, the operation condition of this parent station PS is also brought into the low-power-consumption operation condition.

In the relevant child station $CS_1$, when a change in the condition of the input unit IN is detected under the low-power-consumption operation condition, the first release signal is produced from the release signal outputting means 11.

In accordance with the third automobile multiplex communication system shown in FIG. 3, when the parent station PS judges that the present communication mode corresponds to the normal communication mode, the parent station PS sets the operation conditions of the respective child stations CS to the normal operation conditions so as to establish communications among them. As a result, various information about the respective child stations CS is acquired. Based upon the various acquired information, the parent station PS controls the terminal units TL corresponding to the input unit IN. On the other hand, when the parent station PS judges that the present communication mode corresponds to the low-power-consumption communication mode, the parent station PS transmits instruction information for instructing the low power consumption operation to the respective child stations CS, whereby these child stations CS are brought into the low-power-consumption operation conditions. Subsequently, the parent station PS per se changes the present operation condition thereof into the low-power-consumption operation (wake) condition. Then, when the child station CS senses a change in the condition of the input unit IN connected thereto under the low-power-consumption condition, this child station CS outputs the first release signal from the release signal outputting means 11 to the parent station PS, so that the operation condition of the parent station PS is changed from the low-power-consumption condition to the normal power consumption condition.

On the other hand, upon receipt of this first release signal, the time measuring means 15 starts to measure an elapse of time in the parent station PS. Within a predetermined time period, the judging means 17 judges whether or not the initializing signal is issued from the initializing means 19, by which the operation condition of the relevant child station CS is changed from the low-power-consumption operation (sleep) condition into the normal operation (wake) condition. If this initializing signal is not produced from the initializing means 19, then the judging means 17 can judge that the operation condition of the parent station PS becomes unusual, or abnormal. As a result, the parent station PS forcibly initializes its own operation condition. Accordingly, the operation condition of the parent station PS becomes compulsorily the normal operation (wake) condition, so that the normal operation can be again commenced, and can surely acquire various information from the child stations $CS_2$, $CS_2$, - - - , $CS_n$.

OVERALL ARRANGEMENT OF FIRST AUTOMOBILE MULTIPLEX COMMUNICATION SYSTEM

Figure 4:
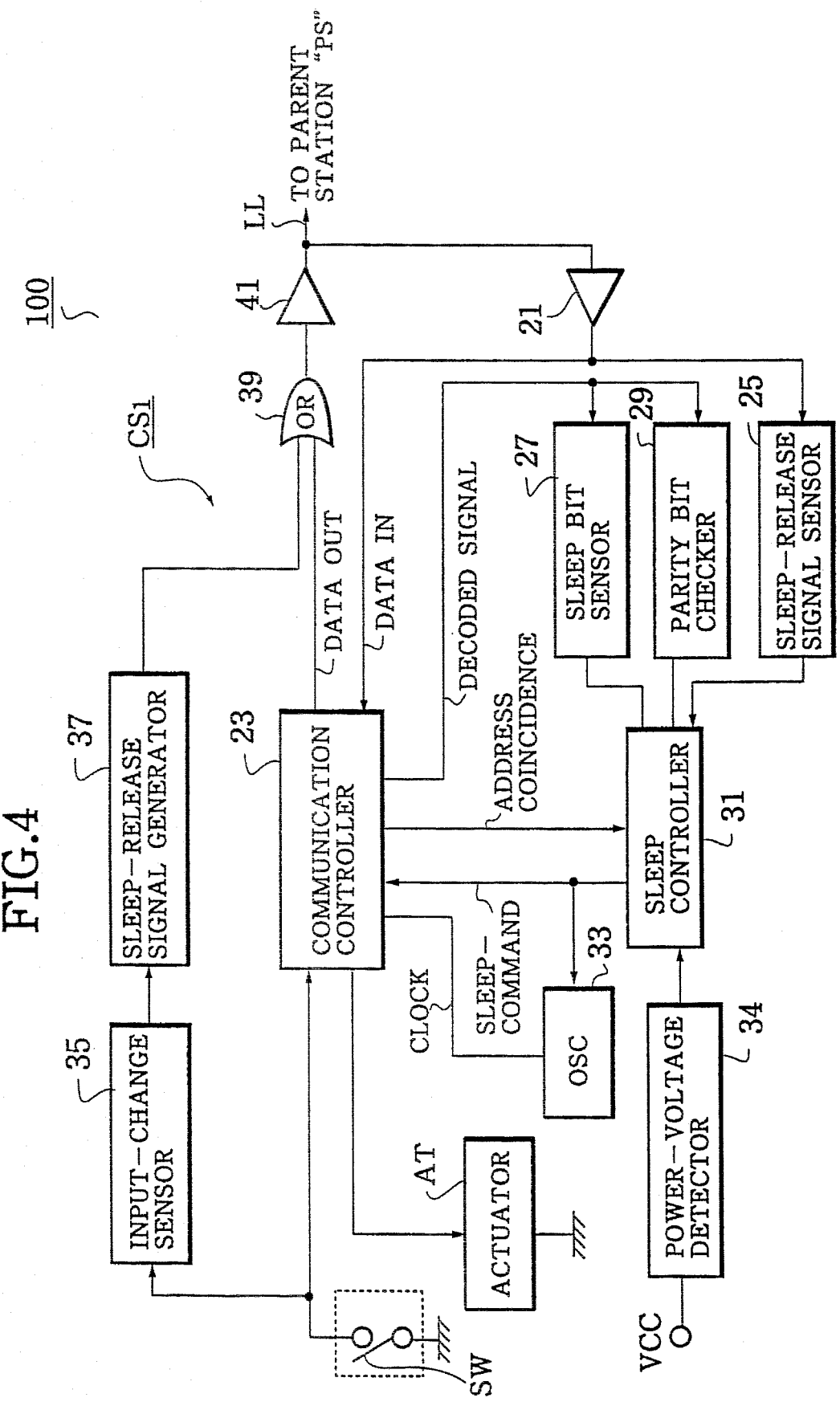
FIG. 4 is a schematic block diagram of an overall circuit arrangement of an automobile multiplex communication system 100 according to a first preferred embodiment of the present invention.
Figure 5:
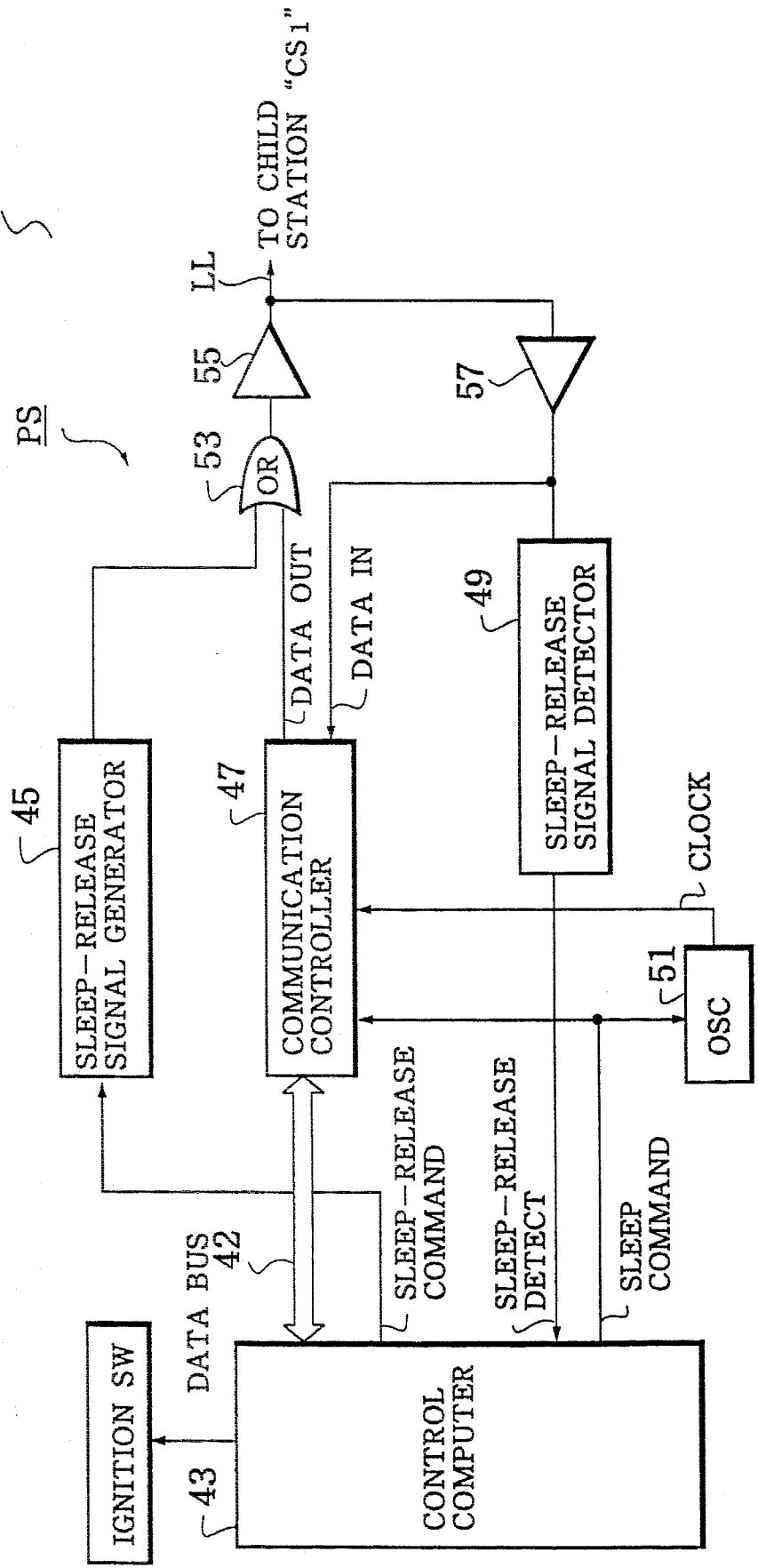
FIG. 5 is a schematic block diagram of an overall circuit arrangement of an automobile multiplex communication system 100 according to the first preferred embodiment of the present invention.

Referring now to FIGS. 4 and 5, an overall arrangement of an automobile multiplex communication system 100 according to a first preferred embodiment of the present invention, will be described. This first automobile multiplex communication system 100 is constructed based on the above-explained first basic idea.

It should be noted that only one child station $CS_1$ shown in FIG. 4 is connected via a common communication line "LL" to a parent station PS indicated in FIG. 5, which constitutes the first automatic multiplex communication system 100, although there are actually provided a plurality of child stations $CS_1$, $CS_2$, - - - , $CS_n$. In other words, either both of a plurality of input-sided child stations to which input units such as switches and sensors are connected, and a plurality of terminal-sided child stations to which terminal units such as actuators and lamps, corresponding to the input units, are connected, or the a plurality of child stations to which these input units and terminal units are connected, are connected via the communication line LL to the parent station PS.

The arrangement of the child station CS$_1$ shown in FIG. 4 will now be explained.

In FIG. 4, the communication line "LL" is connected via an input circuit 21 to a communication control unit 23 and a sleep-release signal detecting circuit 25, so that data supplied from the communication line LL is furnished via the input circuit 21 to the communication control unit 23 and the sleep-release signal detecting circuit 25. This communication control unit 23 is also connected to a sleep-bit detecting circuit 27 and a parity-bit checking circuit 29.

A major function of the communication control unit 23 is to perform a communication control between the child station CS$_1$ and the parent station PS. This communication control unit 23 decodes the data supplied from the parent station PS via the input circuit 21 to obtain a decoded signal, and outputs this decoded signal to the sleep bit detecting circuit 27 and also the parity bit checking circuit 29.

The sleep bit detecting circuit 27 and parity bit checking circuit 29, and a sleep-release signal detecting circuit 25 are connected to a sleep control circuit 31. This sleep control circuit 31 is connected to the communication control unit 23 and an oscillator (OSC) 33.

In case an address coincidence is judged by the communication control unit 23, a sleep bit is detected by the sleep bit detecting circuit 27, and furthermore a parity check result made by the parity bit checking circuit 29 becomes normal, this sleep control circuit 31 outputs a sleep command for changing into the sleep condition both the communication control unit 23 and the oscillator (OSC) 33. As a result, since the oscillating operation of the oscillator 33 is interrupted, total power consumption of this child station CS$_1$ is considerably lowered, as compared with the power consumption of the normal operation condition, resulting in the above-described low-power-consumption operation condition.

The sleep control circuit 31 is further connected to a power-voltage detecting circuit 34. The power-voltage detecting circuit 34 is a means for detecting an instantaneous power interruption of the child station CS$_1$. That is, the power-voltage detecting circuit 34 is connected to a power supply VCC in order to monitor voltage variations in this power supply VCC. When the voltage of this power supply VCC is dropped lower than a predetermined voltage, e.g., 3 V, and thereafter is returned to the normal voltage, e.g., 5 V, a sleep demand signal is issued from the power-voltage detecting circuit 34 and supplied to the sleep control circuit 31.

Also to the communication control unit 23, a switch "SW" corresponding to the input unit "IN" and an actuator "AT" corresponding to the terminal unit "TL" are connected. The switch SW is connected to an input-change detecting circuit 35 which is in turn connected to a sleep-release signal generating circuit 37.

The input-change detecting circuit 35 is operated only when the operation condition of the child station CS$_1$ becomes the sleep condition in such a manner that a change in operations of the switch SW is detected, and the input-change signal is produced and supplied to the sleep-release signal generating circuit 37. The sleep-release signal generating circuit 37 is connected via an OR gate 39 to an output circuit 41. The communication control unit 23 is connected via this OR gate 39 to the output circuit 41, so that data issued from the communication control unit 23 is supplied via the OR gate 39 and the output circuit 41 to the communication line LL.

Referring now to FIG. 5, an arrangement of the parent station PS and a peripheral circuit thereof employed in the first automobile multiplex communication system 100 will be described.

A control computer 43 is employed to be connected to an ignition switch "IG". The control computer 43 monitors rotary positions of this ignition switch IG in order to judge a sort of communication mode in accordance with the rotary positions of the ignition switch IG.

That is, when the ignition switch IG is rotated to an ON position, the control computer 43 judges that the present communication mode corresponds to the normal communication mode, whereas when the ignition switch IG is rotated to an OFF position, the control computer 43 judges that the present communication mode corresponds to the low-power-consumption communication mode. Also, when this ignition switch IG is rotated to an accessary position, the control computer 43 judges that the present communication mode corresponds to an accessary communication mode.

In case the control computer 43 judges that the present communication mode corresponds to the normal communication mode (namely, ON-state of ignition switch IG), this control computer 43 executes a control process for setting the operation conditions of the respective child stations CS$_1$, CS$_2$, - - -, CS$_n$ to the normal operation conditions ("wake" conditions). When a judgement result by the control computer 43 becomes the low-power-consumption communication mode, the control computer 43 executes another control process for setting the operation conditions of the respective child stations CS$_1$, CS$_2$, - - -, CS$_n$ to the low-power-consumption operation conditions ("sleep" conditions). In the sleep conditions, after the operation conditions of the respective child stations CS are brought into the "sleep" conditions under control of the parent station PS, the parent station PS changes its own operation condition into the low-power-consumption operation condition ("Halt" condition). Furthermore, when a judgement result by the control computer 43 becomes the accessary communication mode, the parent station PS changes an operation condition of a specific child station CS into the "sleep" condition, and also executes a communication among other child stations under "wake" conditions with this parent station PS.

Then, the control computer 43 is connected to a sleep-release signal generating circuit 45, another communication control unit 47, a sleep-release signal detecting circuit 49 and an oscillator 51, respectively. The sleep-release signal generating circuit 45 is connected via one input of an OR gate 53 to an output circuit 55 which will then be connected to the above-described communication line LL. The communication control unit 47 of the parent station PS is connected via the other input of the OR gate 53 to the output circuit 55. Accordingly, various data issued from the communication control unit 47 are supplied via the OR gate 53 and the output circuit 55 to the communication line LL (will be discussed later).

Also, this communication line LL is connected via an input circuit 57 to the communication control unit 47 and the sleep-release signal detecting circuit 49, so that various data appearing on this communication line LL are supplied via the input circuit 57 to the communication control unit 47 and the sleep-release signal detecting circuit 49.

INTERNAL CIRCUIT OF COMMUNICATION CONTROL UNIT 23 IN FIRST CHILD STATION CS$_1$

For a better understanding of the major features of the first automobile multiplex communication system 100 shown in FIG. 4, internal circuits of the relevant constructive arrangements thereof will now be explained more in detail.

Figure 6:
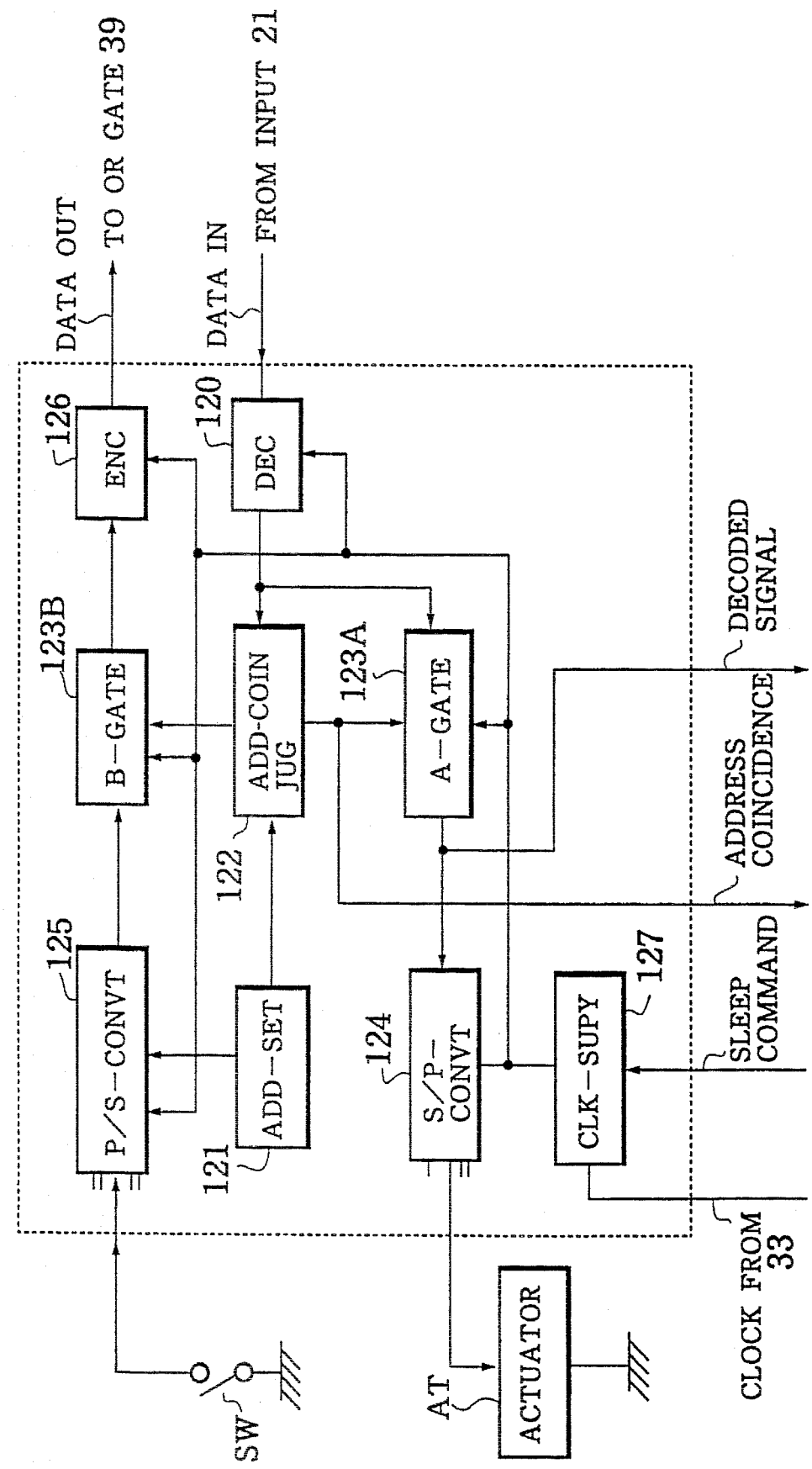
FIG. 6 schematically shows a circuit block diagram of an internal circuit of the communication controller 23 in the first automatic multiplex communication system 100.

First, FIG. 6 shows a circuit block diagram of the above-described communication control unit 23 employed in the first child station $CS_1$ of the first automobile multiplex communication system 100.

In this communication control unit 23 of the first child station $CS_1$, the data inputted from the communication line LL via the input circuit 21 (see FIG. 4), is decoded by a data decoder 120. An address data portion of the decoded data is compared with another address data supplied from an address setting circuit 121 in an address-coincidence judging circuit 122. When the address data portion of the decoder 120 is coincident with the address data of the address setting circuit 121, an address-coincidence signal is outputted from this address-coincidence judging circuit 122. In response to this address-coincidence signal, both of gates 123A and 123B are opened, so that either the data appearing on the communication line LL can be inputted, or the data produced from the first child station $CS_1$ can be outputted to the communication line LL.

Subsequently, information supplied from the gate 123A is converted in a parallel data form by a serial-to-parallel converter 124. The parallel converted data corresponds to load drive data by which the actuator AT can be driven. Information about the switch SW is converted into a serial data form by a parallel-to-serial converter 125. The serial converted data is supplied via another gate 123 to a data encoder 126. In this encoder 126, the serial converted data is modulated and the modulated serial data is outputted to the communication line LL.

In case of the "sleep" condition, the supplies of the clock signal are interrupted by a clock supply circuit 127 in response to the sleep command derived from the sleep control circuit 31 in order that the operation mode of this child station $CS_1$ is brought into the low-power-consumption operation mode, since the respective circuits employed in the communication control unit 23 are driven in accordance with the clock signal.

Now, this low-power-consumption operation will be explained more in detail. That is, generally speaking, it is well-known in a CMOS logic circuit that if there is no logic change, power consumption of this CMOS logic circuit is lowered. On the other hand, according to this first preferred embodiment, there are provided a large number of circuits which receive the clock signals and are operable in response to the timings of these clock signals. As a consequence, if the supply of clock signals is interrupted, namely interruption of the oscillator 33, the respective circuits are brought into OFF states, resulting in low power consumption.

INTERNAL CIRCUIT OF INPUT-CHANGE DETECTING CIRCUIT 35 IN FIRST CHILD STATION $CS_1$

Figure 7A:
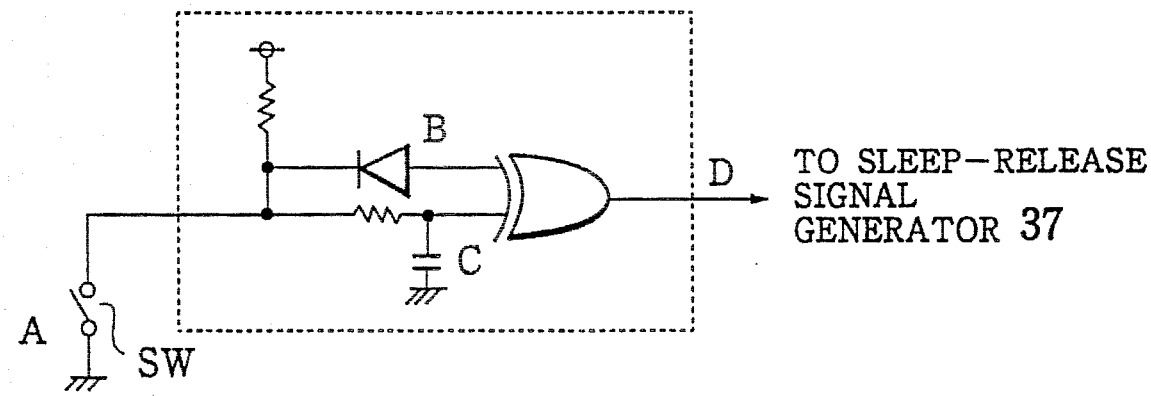
FIG. 7A is a circuit arrangement of the input-change detecting circuit 35 shown in FIG. 4.
Figure 7B:
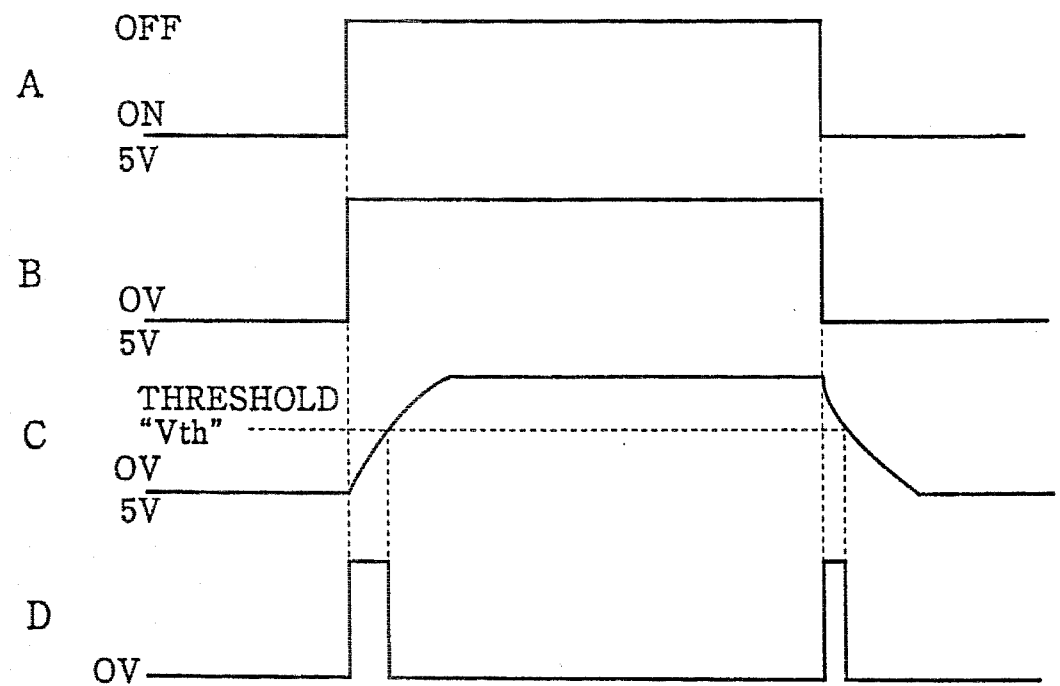
FIG. 7B is a waveform chart for various signals appearing in the input-change detecting circuit 35.

FIG. 7A represents a circuit diagram of the input-change detecting circuit 35 employed in the first child station $CS_1$ shown in FIG. 4. FIG. 7B shows various waveforms of signals appearing in various portions of this input-change detecting circuit 35.

As apparent from FIGS. 7A and 7B, since this input-change detecting circuit 35 is arranged by the well-known electronic components such as a diode and an exclusive-OR gate, no further detailed explanations thereof are made in this specification.

Moreover, since this input-change detecting circuit 35 does not correspond to the above-explained circuit operable in response to the clock signal, this detecting circuit 35 can be operated even in the "low-power-consumption" operation mode.

INTERNAL CIRCUIT OF COMMUNICATION CONTROL UNIT 47 IN PARENT STATION PS

Figure 8:
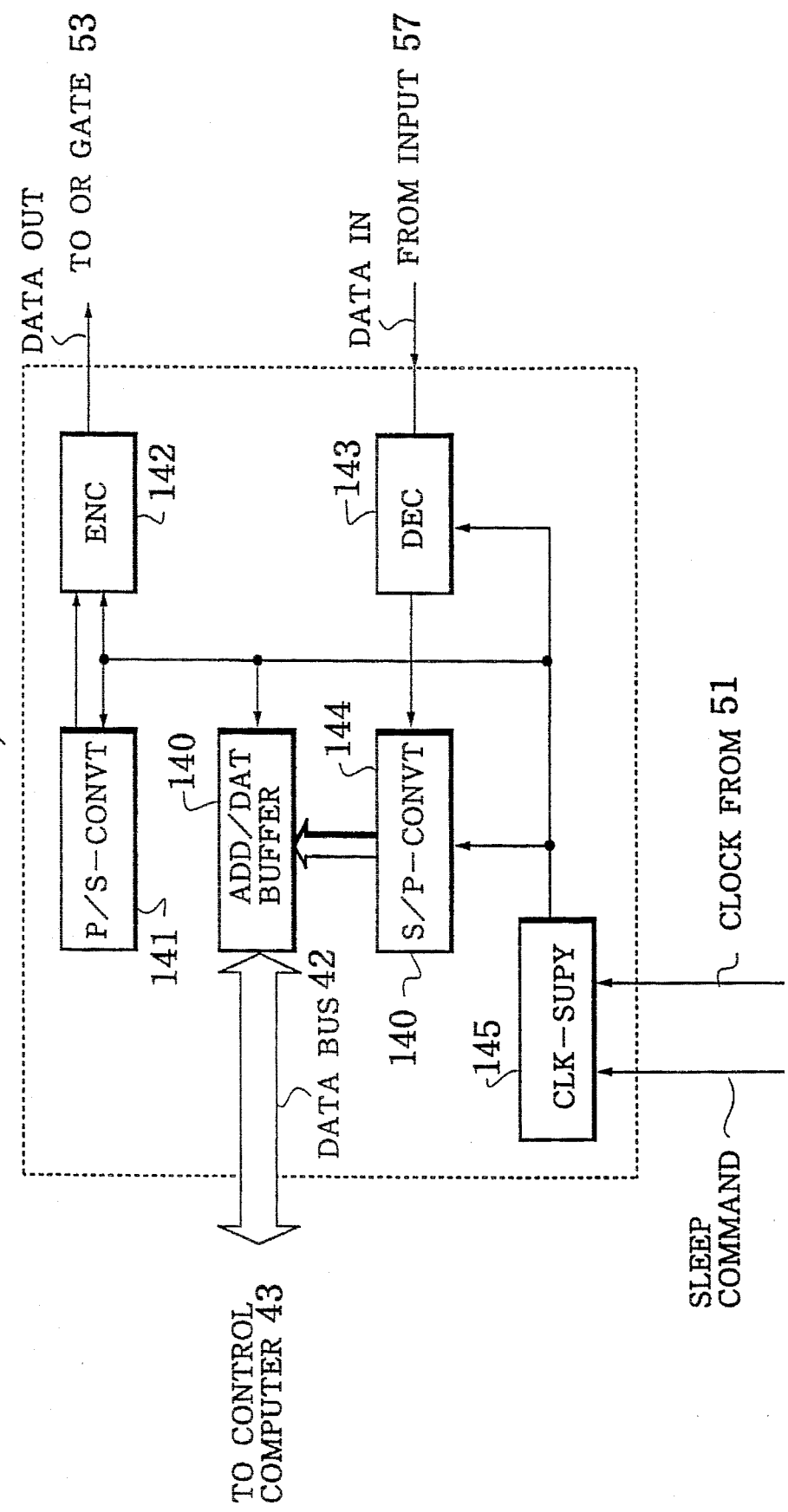
FIG. 8 is a schematic block diagram of an internal circuit diagram of the communication control unit 47.

FIG. 8 schematically shows an circuit block diagram of the communication control unit 47 employed in the parent station PS indicated by FIG. 5.

In this communication control unit 47, a address and data about the child station CS are sent via the data bus 42 to an address data buffer 140. This data is converted into a serial data form by a parallel-to-serial converter 141 to obtain serial converted data. The serial converted data is modulated (encoded) by a data encoder 142, so that encoded serial data is sent to the communication line LL via the OR gate 53 and the output circuit 55 (see FIG. 5).

Also, data appearing on the communication line LL is demodulated (decoded) by a data decoder 143 to produce decoded serial data. The decoded serial data is converted into a parallel data form by a parallel-to-serial converter 144. The converted parallel data is supplied to the address/data buffer 140, and then this data is fetched via the data bus 42 by the control computer 43 (see FIG. 5).

Also during the sleep operation condition, a clock supply circuit 145 interrupts the supply of the clock signals to the various internal circuits of this communication control unit 47 in response to the sleep command. As a consequence, this normal operation condition can be changed into the low-power-consumption operation condition.

In connection with the above-described communication control operations by the communication control unit 47, control operations by the control computer 43 will now be summarized.

That is, a judgement of the "sleep" mode of the parent station PS is performed in such a manner that when the ignition switch "IG" is turned OFF to produce a trigger signal, the operation conditions of the entire system 100 are changed into the "sleep" mode in response to this trigger signal.

In principle, there is no data appearing on the communication line "LL" during the sleep mode. As a consequence, if any detection of signal waveform is made on the communication line LL during the sleep mode, it can be judged by the control computer 43 that a sleep-release demand is issued from the relevant child station CS.

Furthermore, when the ignition switch IG is turned ON in the parent station PS, the communication mode of the parent station PS is brought into the normal communication mode.

INTERNAL-CIRCUIT OF POWER-VOLTAGE DETECTING CIRCUIT 34

Figure 17A:
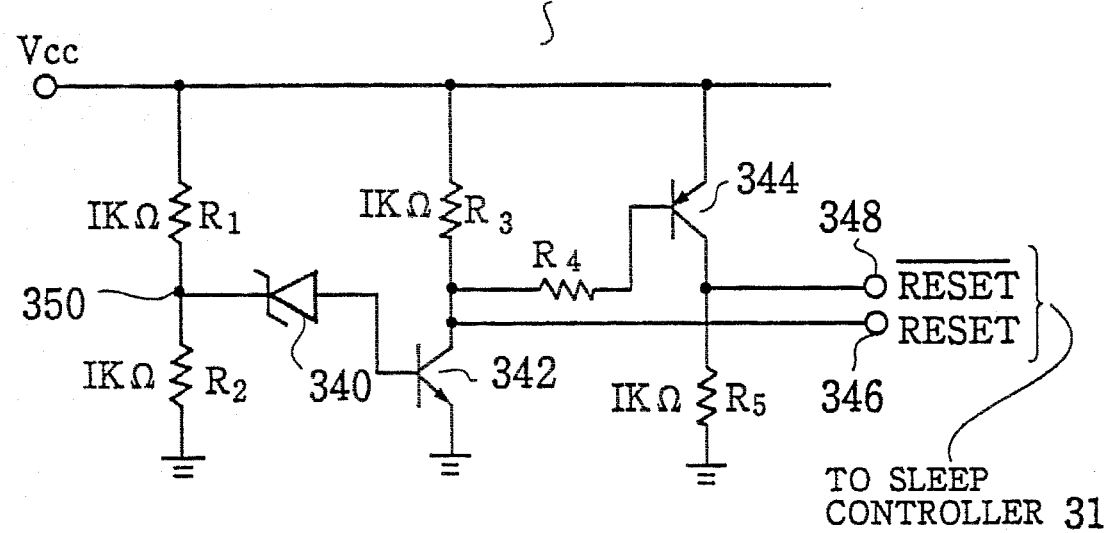
FIG. 17A is a circuit diagram of the power-voltage detecting circuit 34 employed in the first automobile multiplex communication system 100 shown in FIG. 4.
Figure 17B:
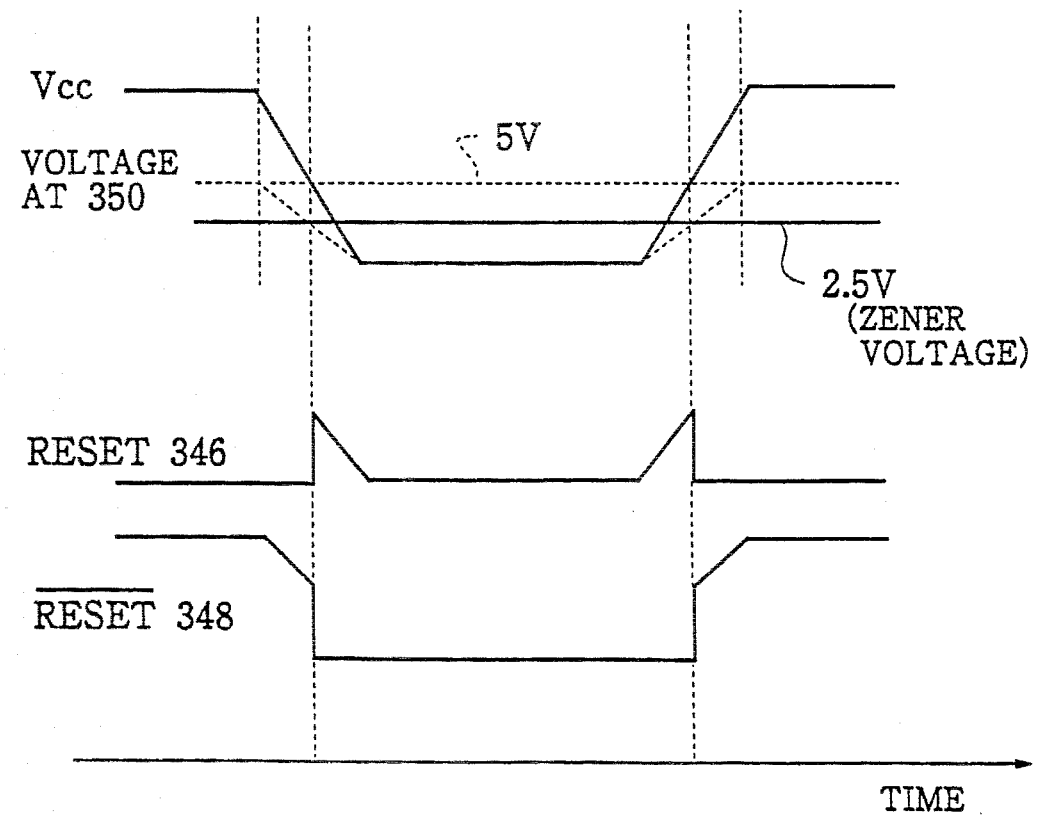
FIG. 17B shows a waveform chart of the power-voltage detecting circuit 34.

FIG. 17A is a circuit diagram of the power-voltage detecting circuit 34 employed in the first automobile multiplex communication system 100 shown in FIG. 4. FIG. 17B shows a waveform chart of various circuit points in the power-voltage detecting circuit 34 of FIG. 17A.

This power-voltage detecting circuit 34 indicated in FIG. 17A is mainly arranged by a zener diode 340, an NPN transistor 342 and a PNP transistor 344. A zener voltage of this zener diode 340 is selected to be 2.5 V in this circuit of FIG. 17A.

A power voltage "$V_{cc}$" (e.g., 12 V) of the automobile multiplex communication system 100 is detected as follows:

When the power voltage $V_{cc}$ becomes lower than 5 V, no current flows through the zener diode 340. As a consequence, the first NPN transistor 342 is turned OFF and the second PNP transistor 344 is also turned OFF. Thus, an "H"-level signal is produced from a RESET terminal 346 connected to the collector of the first NPN transistor 342, and at the same time, an "L"-level signal is produced from a $\overline{\text{RESET}}$ terminal 348 connected to the collector of the second PNP transistor 344. These reset signals are supplied to the sleep control circuit 31 shown in FIG. 4.

In FIG. 17B, a voltage appearing at a junction between a resistor $R_1$ and a resistor $R_2$, namely a cathode of the zener diode 340, is represented as "350".

In accordance with this power-voltage detecting circuit 34, a variation in the power source voltage $V_{cc}$ can be firmly detected.

DATA FRAME FORMAT USED IN FIRST AUTOMOBILE MULTIPLEX COMMUNICATION SYSTEM 100

Referring now to FIGS. 9 to 11, a data frame format used in the first automobile multiplex communication system 100 will be explained.

As represented in FIG. 9, a data frame is constructed of a frame identifier "ID"; a destination address field "ADF"; a send data field "SDF", and a receive data field "RDF".

The destination address field "ADF" is arranged by, as shown in FIG. 10, 6-bits of address bits A5, A4, A3, A2, A1 and A0; 1 bit of sleep bit "S" and 1 bit of parity bit "P", namely 8 bits.

In the child station $CS_1$, upon receipt of the data having the above-described data format shown in FIG. 9 and FIG. 10, the address bits A5 to A0 are compared with its own address in the address coincidence judging circuit 122 of the communication controller 23 (see FIG. 6). If the coincident is made in these address bits, the operation condition of this child station $CS_1$ is brought into the operation condition defined by the sleep bit "S", for instance, when the "sleep" condition is demanded, the child station $CS_1$ is brought into the "sleep" condition. At this time, since the parity check is done, erroneous operation of the child station $CS_1$ can be prevented.

Both of "0"-code and "1"-code of the respective bits are designed as shown in FIGS. 11A and 11B. As apparent from these figures, a time duration of an "H"-level of the "0"-code is set to be shorter than a half of 1 bit period, whereas a time duration of an "H"-level of the "1"-code is set to be longer than a half of 1 bit period. This implies that since each code owns either a rising edge, or a falling edge, an easy data synchronization can be achieved and error data is reduced.

Also, as shown in FIG. 11C, the sleep-release signal is set in such a manner that a time duration of an H-level of this sleep-release signal is selected to be longer than a 1-bit period.

OVERALL OPERATION OF FIRST AUTOMOBILE MULTIPLEX COMMUNICATION SYSTEM 100

Referring now to a flow chart shown in FIG. 12, an overall operation of the first automobile multiplex communication system 100 will be described.

When a battery (not shown in detail) is electrically connected to this multiplex communication system 100, DC power is supplied to both of the parent station PS and the first child station $CS_1$, so that operations of the respective circuits are commenced. Then, a program of the control computer 443 is read in the parent station PS to execute a series of control operations as defined in this flow chart.

Figure 12:
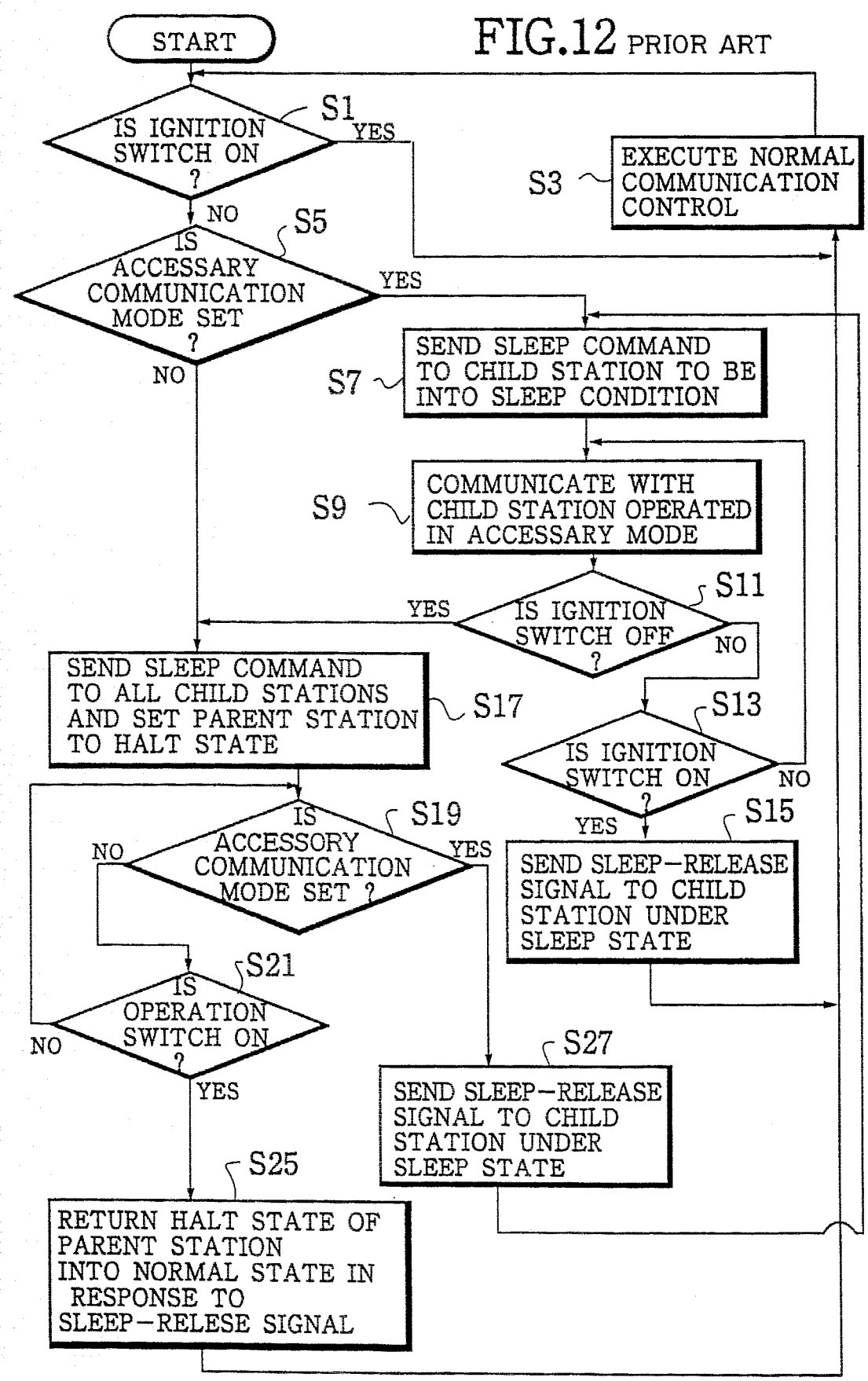
FIG. 12 is a flow chart for showing an operation of the first automobile multiplex communication system 100.

In the flow chart of FIG. 12, this control computer 43 of the parent station PS monitors the rotary position of the ignition switch IG at a first step S1. Then, at a step S5, the control computer 43 judges whether or not the present communication mode corresponds to the accessary communication mode. That is, when the ignition switch IG is rotated to the ON-position, the control computer 43 judges that the present communication mode corresponds to the normal communication mode at the step S1. Then, the control process is advanced to a step S3 at which a control process for setting the operation condition of the child station CS to the "wake" condition is executed. As a result, the normal communication is performed among the parent station PS and the respective child stations CS.

To the contrary, when the ignition switch IG is rotated to a position other than the ON-position at the previous step S1, the control process is advanced to a step S5. At this step S5, a judgement is made as to whether or not the ignition switch IG is rotated to the accessary communication position. If the judgement result becomes YES (i.e., accessary communication mode), then, the control process is advanced to a step S7, at which a sleep command is transmitted from the parent station PS to a specific child station CS which should be brought into the sleep condition.

At the subsequent step S9, a communication is established between the parent station PS and the specific station CS operable under accessary communication mode. At a step S11, the control computer 43 judges whether or not the ignition switch IG is rotated to the OFF position. If the ignition switch IG is not rotated to the OFF position, then the control process is advanced to a step S13 at which a check is done whether or not the ignition switch IG is rotated to the ON position.

To the contrary, if the ignition switch IG is rotated to the ON position, then the control computer 43 judges that the present communication mode corresponds to the normal communication mode. Accordingly, the control process is advanced to a step S15 at which a sleep-release signal is sent to the child station CS operated under the sleep condition. Subsequently, the control process is returned to the step 1 at which the normal communication is performed. When the ignition switch IG is not rotated to the ON position at the step S13, the control process is again returned to the previous step S9. At this step S9, a communication is established between the parent station PS and the specific child station CS operable under the accessary communication mode.

If a judgement is made at the step S11 that the ignition switch IG is rotated to the OFF position, or if another judgement is made at the step S5 that the present communication mode does not correspond to the accessary communication mode, then the control process is advanced to a further step S17. At this step S17, a sleep command is transmitted to all of the child stations $CS_1$, $CS_2$, - - - $CS_n$, whereby the operation conditions of all child stations are set to the sleep conditions. Next, the operation condition of the parent station PS is brought into an operation rest condition, i.e., a halt condition.

At the subsequent step S19, a check is done as to whether or not the present communication mode corresponds to the accessary communication mode. If the check result becomes "NO", then the control process is advanced to a step S21 at which another check is made as to whether or not the operation switch SW corresponding to the input unit is manipulated.

At this step S21, when no sleep-release signal is supplied from the child station having the above-explained operation switch SW into the parent station PS, the control computer 43 judges that no operation switch SW is manipulated, and then the control process is returned to the previous step S19. To the contrary, when the sleep-release signal is supplied from the child station CS having the above operation switch SW into the parent station PS, the control computer judges that the operation switch SW is manipulated, and therefore the control process is advanced to a step S25. At this step S25, the present "halt" state of the parent station PS is returned to the "wake" state. Next, the control process is returned to the previous step S3 at which the normal communication is carried out.

Further, when the control computer 43 judges that the present communication mode corresponds to the accessary communication mode at the step S19, the control process is advanced to a step S27. At this step S27, a sleep-release signal is sent to the child station CS under the sleep state. As a result, the operation conditions of all child stations CS are once set to the wake conditions. Subsequently, the control process is returned to the step S7 at which a control of the accessary communication mode is carried out. In other words, a sleep command is transmitted to a specific child station CS to be brought into the sleep condition at the step S7, and a communication is carried out between this parent station PS and the specific child station CS operated under the accessary communication mode.

DETAILED CONTROL OPERATION BETWEEN PARENT STATION PS AND FIRST CHILD STATION CS1

Then, a description will be made of a control operation when the first child station $CS_1$ shown in FIG. 4 is coupled with the parent station PS of FIG. 5 in the first automobile multiplex communication system 100.

Under such a condition that the ignition switch IG is turned OFF and the operation conditions of both the parent station PS and the first child station $CS_1$ are under sleep conditions, when a voltage of a power supply to the first child station $CS_1$ is suddenly varied, this condition is substantially identical to the condition that the power supply is turned ON. This sudden voltage change is caused by such a fact that the power supply line to the first child station $CS_1$ is instantaneously interrupted, or a connector (not shown in detail) for connecting the first child station $CS_1$ with the parent station PS is electrically disconnected. As a result, the present sleep condition of the first child station $CS_1$ is changed into the wake condition. At the same time, such an instantaneous interruption of the power supply voltage VCC is detected by the power-voltage detecting circuit 34. Upon detection of the instantaneous interruption of the power supply voltage VCC, the power-voltage detecting circuit 34 produces a sleep demand signal to the sleep control circuit 31. Upon receipt of this sleep demand signal, the sleep control circuit 31 performs a control for compulsorily changing the present operation into the "sleep" condition, irrelevant to any signals derived from the sleep-release signal detecting circuit 25, the sleep bit detecting circuit 27, and the parity bit checking circuit 29. That is, the sleep control circuit 31 outputs the sleep command to the communication control unit 23 and the oscillator 23. As a result, when the instantaneous interruption of the power supply voltage VCC occurs, the operation (wake) condition of the first child station $CS_1$ is automatically, compulsorily brought into the sleep condition.

Under such a circumstance, when a detection by the input-change detecting circuit 35 is made of manipulation of the switch SW, for instance, a key cylinder switch provided at a door near a driver's seat is manipulated (at the step S21), the sleep-release signal generating circuit 37 sends out the sleep release signal to the parent station PS. As a consequence, since the operation condition of the parent station PS is recovered from the "halt" state to the "wake" state at the step S25, the normal communication can be established between the parent station PS and the first child station $CS_1$ at the step S3.

This normal communication operation is carried out as follows:

First, the parent station PS successively calls up a plurality of child stations $CS_1$, $CS_2$, - - -, $CS_n$ (see FIG. 1) in accordance with a predetermined sequence, so as to acquire operation information about the switch SW. The control computer 43 employed in the parent station PS previously stores the switching conditions of the respective switches SW before the sleep conditions, and thus compares these switching conditions with switching conditions after the wake conditions. On the other hand, if the switch SW of a certain child station CS has been manipulated, this switch operation condition is maintained. Otherwise, the control computer 43 stores that this switch SW has been manipulated.

Then, when the parent station PS calls up such a child station CS whose switch SW has been manipulated and which is under the sleep condition, the switching condition of this switch SW in this child station is changed into the switching condition of the switch SW before the sleep condition.

Accordingly, the parent station PS confirms that the above-described switch SW has been operated, and can control the drive of the terminal unit TL corresponding to this switch SW. Thus, the terminal unit TL corresponding to this switch SW can be firmly driven.

Next, during the normal communication mode where both of the parent station PS and the child station CS are brought into the "wake" conditions (namely, the ignition switch IG is turned ON), when the instantaneous interruption of the power supply voltage in the child station CS is detected by the power-change detecting circuit 34, the operation conditions of the child stations are automatically brought into the sleep conditions in a similar manner to that of the above-described communication mode. Under such a circumstance, since no answer can be issued from the child station CS in response to any inquiry made from the parent station PS, the parent station PS judges that the inquired child station CS is under the sleep condition. Thereafter, the parent station PS transmits the sleep release signal to this relevant child station CS. As a consequence, the sleep operation condition of this child station can be recovered to the wake condition established before the instantaneous interruption of the power supply voltage VCC happens to occur. Accordingly, the normal communication can be established between this child station CS and the parent station PS.

As previously described in detail, in the first automobile multiplex communication system 100 according to the first preferred embodiment of the present invention, when the instantaneous interruption of the power supply voltage in the child station is detected, the operation condition of this child station is compulsorily changed into the sleep condition, so that operabilities of this system can be improved and the low power consumption thereof can be achieved.

OVERALL ARRANGEMENT OF SECOND AUTOMOBILE MULTIPLEX COMMUNICATION

Figure 13:
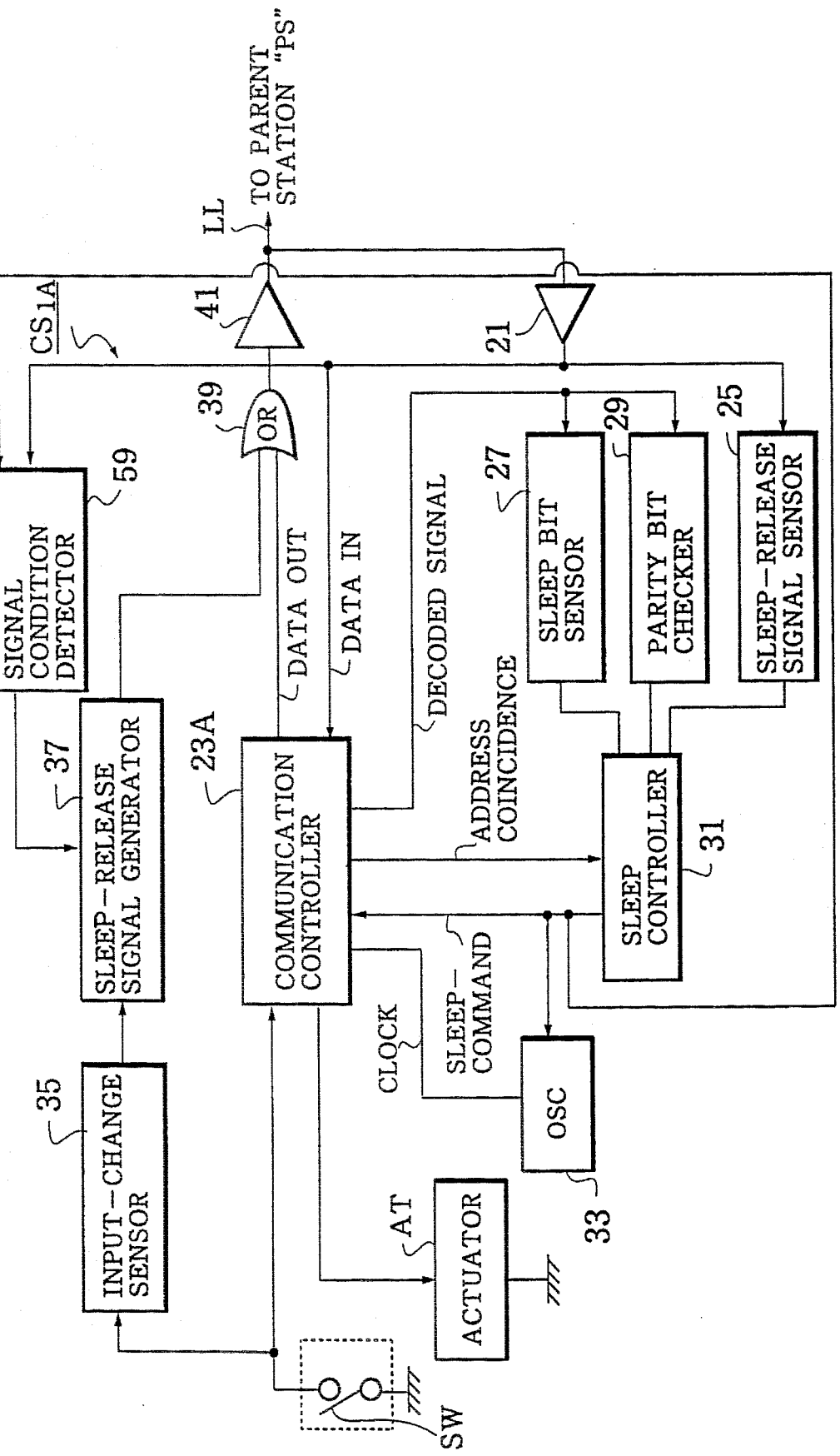
FIG. 13 is schematically indicates an overall arrangement of an automobile multiple communication system 200 according to a second preferred embodiment of the present invention.

FIG. 13 schematically shows an overall arrangement of an automobile multiplex communication system 200 according to a second preferred embodiment of the present invention, which is accomplished based on the second basic idea.

It should be noted that the same reference numerals shown in FIGS. 4 and 5 will be employed as those for denoting the same or similar circuit elements shown in the following drawings.

As previously summarized with reference to FIG. 2, a major feature of this second automobile multiplex communication system 200 is achieved as follows. In a child station CS, there are provided the first detecting means 5 for detecting that the child station CS is under wake condition, and the second detecting means 7 for detecting that no input signal is supplied to this child station CS, namely under non-input-signal condition. When the child station is under the wake condition and also is under the non-input-signal condition, this child station will judge that the present condition of the parent station PS is the "halt" condition. Accordingly, this child station CS outputs a release signal for releasing the child condition of this parent station PS.

Referring back to the circuit arrangement of FIG. 13, a more concrete explanation of the second automobile multiplex communication system 200 will now be made. A non-input-signal condition detecting circuit 59 is newly employed at an output side of the input circuit 21 in a first child station "$CS_{1A}$". This non-input-signal condition detecting circuit 59 monitors an input signal to be supplied to this child station "$CS_{1A}$". This non-input-signal condition detecting circuit 59 corresponds to the above-described first and second detecting means 5 and 7. This detecting circuit 59 is operable only under such a condition that the child station $CS_{1A}$ is under the non-input-signal condition. That is to say, when the child station $CS_{1A}$ is under the wake condition and also is under the non-input-signal condition, this non-input signal condition detecting circuit 59 issues a detection signal which will then be supplied to the sleep-release signal generating circuit 37.

It should be noted that since a circuit arrangement of the above-described parent station "PS" is similar to that of the parent station "PS" shown in FIG. 5, no further explanation thereof is made in this second automobile multiplex communication system 200.

INTERNAL CIRCUIT OF NON-INPUT-SIGNAL CONDITION DETECTING CIRCUIT 59

Figure 14A:
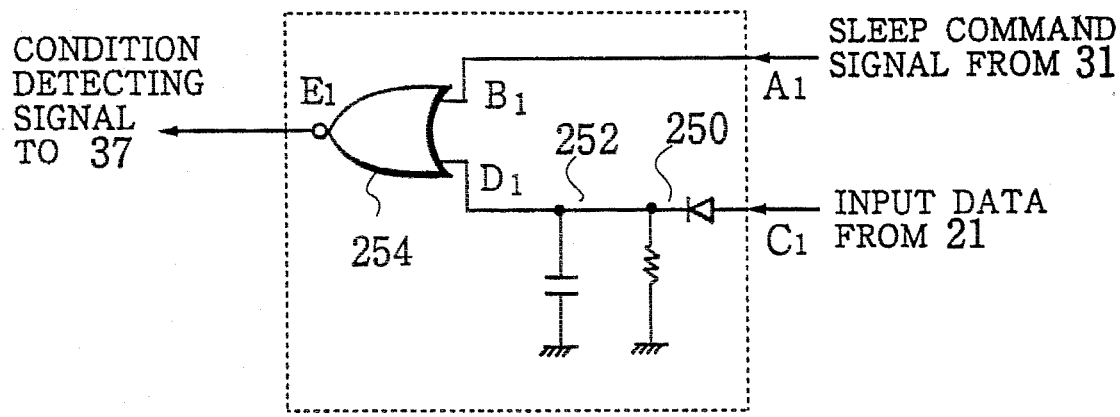
FIG. 14A is an internal circuit diagram of the non-input-signal condition detecting circuit 59 employed in the second automobile multiplex communication system 200.
Figure 14B:
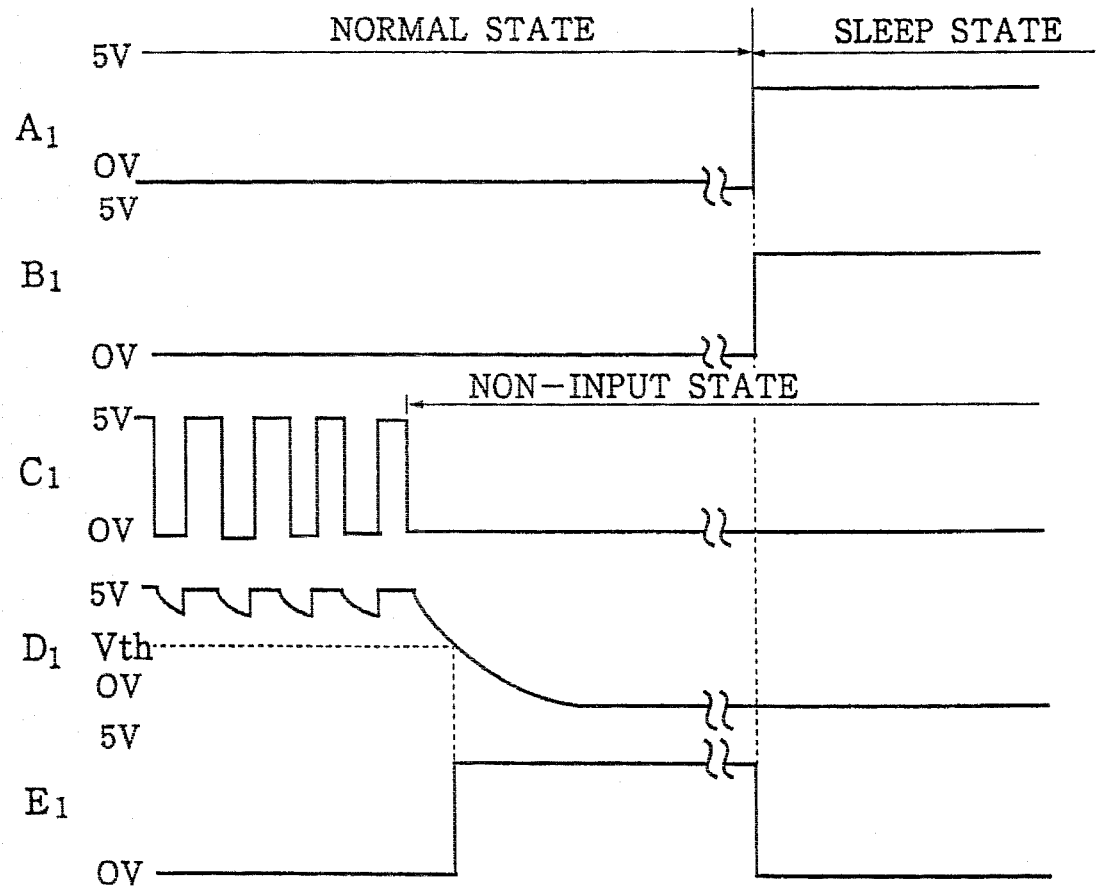
FIG. 14B is a waveform chart of various signals appearing in the non-input-signal condition detecting circuit 59.

FIG. 14A shows an internal circuit diagram of the non-input-signal condition detecting circuit 59, and FIG. 14B is a waveform chart of various signals in the non-input-signal condition detecting circuit 59.

As apparent from FIG. 14, the input data derived from the input circuit 21 is supplied to a differentiating circuit 250 constructed of a diode and a resistor. An output signal from the differentiating circuit 250 is supplied to an integrating circuit 252 constructed of a capacitor. An output from this integrating circuit 252 is supplied to one input terminal of an exclusive OR gate 252, whereas the sleep command signal from the sleep control circuit 31 is supplied to the other input terminal of this exclusive OR gate 252.

As seen from the waveform chart of FIG. 14B, an "H" level signal is derived from this exclusive OR gate 254 during the non-input signal condition under the normal operation (wake) condition, as a non-input-signal condition signal "$E_1$". Then, the non-input-signal condition signal "$E_1$" is supplied to the sleep-release signal generating circuit 37.

OVERALL OPERATION OF SECOND AUTOMOBILE MULTIPLEX COMMUNICATION SYSTEM 200

Referring again to the flow chart of FIG. 12, an overall operation of the second automobile multiplex communication system 200 will now be summarized. In case of the low-power-consumption communication mode, namely when the ignition switch IG of the parent station PS (see FIG. 5) is rotated to the OFF position, the operation conditions of all child stations $CS_{1A}$, - - -, $CS_{1nA}$ are set to the sleep conditions, and the operation condition of the parent station PS is set to the "halt" condition. When an instantaneous power interruption of a child station operated under the sleep condition happens to occur, the sleep operation condition of this child station is recovered to the wake condition.

When the non-input-signal condition detecting circuit 59 detects that the child station CS is operated under the wake condition and no input signal is supplied to this child station CS even under such a low-power-consumption communication mode, the non-input-signal condition detecting signal "$E_1$" is supplied from this detecting circuit 59 to the sleep-release signal generating circuit 37. Upon receipt of this condition detecting signal from the non-input-signal condition detecting circuit 59, the sleep-release signal generating circuit 37 outputs a sleep release signal via the OR gate 39 and the output circuit 41 to the communication line LL in order that the "halt" state of the parent station PS is released.

As a result, at the step S21 of FIG. 12, the judgement result becomes YES in the parent station PS, and then the "halt" condition thereof is recovered to the normal operation condition at the step S25. When the parent station PS is recovered to the wake condition, the parent station PS is returned to the initial state where the control process is executed. In other words, when the parent station PS judges that the ignition switch IG has been rotated to the OFF position (namely "NO" at the step S1 and "NO" at the step S5), the sleep commands are sent to all of the child stations $CS_{1A}$, - - -, $CS_{1nA}$ to be brought into the sleep conditions. Thereafter, the parent station PS is brought into the "halt" state.

As previously explained in detail, in case that the child station is operated under the wake condition, and also no input signal is supplied to this child station (namely, non-input-signal condition), the child station judges that the parent station is under the "halt" state and therefore outputs the release signal for releasing this halt condition of the parent station PS. As a consequence, all of the child stations are set to the sleep conditions in the low-power-consumption communication mode. Even if only the child station under the sleep conditions is recovered to the wake condition, this child station can be brought into the sleep state due to the instantaneous power interruption of the child station operated under the sleep condition.

OVERALL ARRANGEMENT OF THIRD AUTOMOBILE MULTIPLEX COMMUNICATION SYSTEM 300

A major feature of an automobile multiplex communication system 300 according to a third preferred embodiment of the present invention will now be summarized, which is accomplished based on the third basic idea.

In accordance with the third automobile multiplex communication system 300, a child station CS detects a change in an input unit such as a switch connected to this child station CS during a low-power-consumption operation condition, and this child station produces a first release signal for releasing a halt condition of a parent station PS. On the other hand, the parent station PS includes a release-signal detecting means for detecting an input (supply) of the first release signal used to release the halt condition of the parent station PS; a time measuring means for measuring an elapse of time after this first release signal is inputted; and a judging means for judging whether or not a second release signal used to release the low-power-consumption operation of the child station has been outputted within a predetermined time period measured by the time measuring means. When the judging means judges that no release signal has been outputted, the operation condition of the parent station is compulsorily changed into the normal operation condition.

Figure 15:
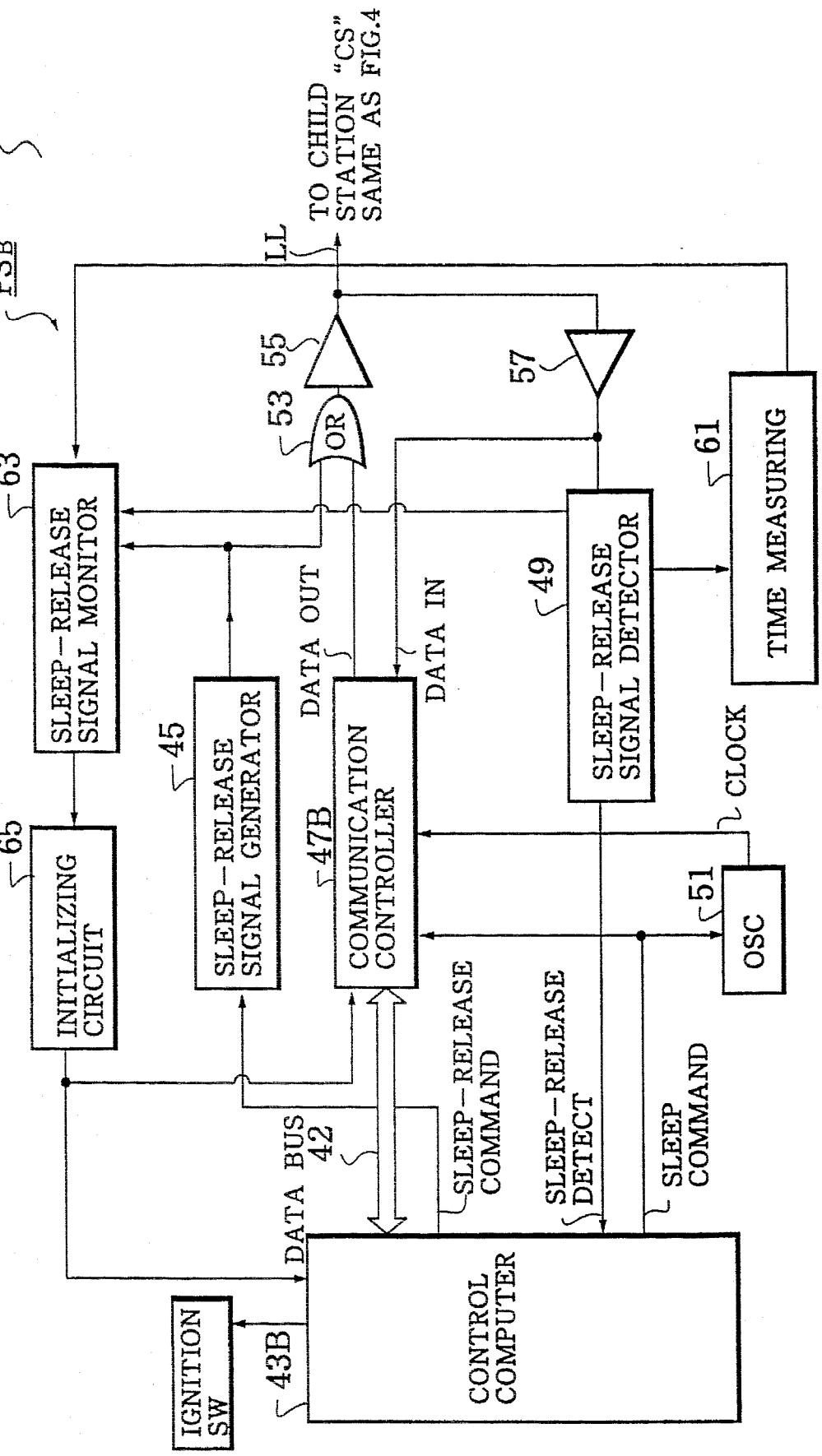
FIG. 15 schematically illustrates an overall circuit arrangement of an automatic multiplex communication system 300 according to a third preferred embodiment of the present invention.

Concretely speaking, the sleep-release signal detecting circuit 49 connected to the output terminal of the input circuit 57 employed in the parent station "$PS_B$" shown in FIG. 15, corresponds to the release signal detecting means for detecting the supply of the first release signal used to release the halt state of the parent station "$PS_B$". Upon detection of such a first release signal, the sleep-release signal detecting circuit 49 outputs the detection signal to a control computer 43B, the time measuring circuit 61, and a sleep-release signal monitoring circuit 63 corresponds to the above-described time measuring means for measuring an elapse of time (i.e., a predetermined time period) since the detection signal has been supplied thereto from the sleep-release signal detecting circuit 119. A predetermined time period is selected to be slightly longer than a time period defined from the input of the "halt"-state release signal until the output of the release signal for releasing the low-power-consumption operation condition of the child station CS. This time period may be selected to be, for instance, 100 milliseconds.

When a predetermined time period, e.g., 100 ms has passed, the time measuring circuit 61 outputs a completion signal to the sleep-release signal monitoring circuit 63 corresponding to the above-described judging means for judging whether or not the second release signal used to release the low-power-consumption operation of the child station has been issued within a predetermined time period (100 ms).

INTERNAL CIRCUIT OF SLEEP-RELEASE SIGNAL MONITORING CIRCUIT 63

FIG. 16A shows an internal circuit diagram of the above-explained sleep-release signal monitoring circuit 63. FIG. 16B is a waveform chart of various signals appearing in this sleep-release signal monitoring circuit 63. FIG. 16C indicates a truth table of the sleep-release signals.

In FIG. 16A, two NAND gates 360 and 362 receive the first sleep-release signal from the sleep-release signal generating circuit 45 and the sleep-release signal detection signal from the sleep-release signal detecting circuit 49 respectively. Further, an AND gate 364 receives the time measuring signal from the time measuring circuit 61. Then, an initializing demand signal "$E_2$" is derived from this AND gate 364, and then supplied to the initializing circuit 65.

OPERATION OF THIRD AUTOMOBILE MULTIPLEX COMMUNICATION SYSTEM 300

Referring back to FIG. 4 and FIG. 15, an operation of the third automobile multiplex communication system 300 will now be explained.

First, when the switch SW of the child station $CS_1$ (see FIG. 4) is manipulated, the first sleep release signal is issued from the sleep-release signal generating circuit 37.

Then, when the sleep-release signal monitoring circuit 63 employed in the parent station PS receives the detection signal from the sleep release signal detecting circuit 49, this monitoring circuit 63 monitors the output signal from the sleep-release signal generating circuit 45. At this time, if the sleep-release signal monitoring circuit 63 detects that no sleep-release signal is outputted from the sleep-release signal generating circuit 45 within a predetermined time period, then this monitoring circuit 63 judges that the first sleep release signal can not be accepted from the child station CS due to the extraordinary condition of the control computer 43B. In other words, when a detection is made that no second release signal for releasing the low-power-consumption operation of the child station CS is issued, such a sleep-release signal from the child station is not received. Then, the sleep-release signal generating circuit 37 sends out the initializing demand signal to the initializing circuit 65. Upon receipt of this initializing demand signal, the initializing circuit 65 initializes both of the control computer 43B and the communication control unit, so that the parent station PS is forcibly brought into such a condition when the power supply is turned ON. Therefore, the operation condition of the parent station PS becomes again the normal operation condition. At this time, the second release command is sent to the sleep-release signal generating circuit 45 and the second sleep release signal is entered into the child station CS. As a result, the operation state of the child station CS becomes the "wake" condition, whereby the operation information about the switch SW of the child station CS is transmitted to the parent station PS.

As previously explained in detail, when the child station CS detects the operation of the switch SW connected thereto under the low-power-consumption operation of this child station, the child station CS issues the first release signal used for releasing the halt state of the parent station PS. On the other hand, upon detection of this halt-condition releasing signal, the parent station PS judges whether or not the second release signal for releasing the low-power-consumption operation of the child station has been outputted within a predetermined time period after this second release signal has been entered. If a judgement result is made that this second release signal has not been outputted, then the operation condition of the parent station PS is compulsorily changed into the normal operation condition by this parent station PS per se. As a result, the information derived from the child stations can be surely acquired by the parent station PS.

What is claimed is:

1. A multiplex communication system used in an automobile, comprising:
    a parent station having at least judging means for judging whether or not a present communication mode of said multiplex communication system corresponds to one of a normal communication mode and a low-power-consumption mode;

at least one child station including:

detection means for detecting that a supply of power to said child station is instantaneously interrupted, thereby producing a detection signal, and compulsorily condition changing means for compulsorily changing a present operation condition of said child station into a low-power-consumption operation condition in response to said detection signal;

a communication line for mutually connecting said parent station and said child station;

means for changing the present operation condition of said child station into the normal communication mode;

whereby when said judging means judges that the present communication mode of the multiplex communication system corresponds to said normal communication mode, said judging means sets operation conditions of said child station and said parent station to normal operation conditions so as to perform a communication between said child station and said parent station, and when said judging means judges that the present communication mode of the multiplex communication system corresponds to said low-power-consumption communication mode, said judging means transmits to said child station, an instruction for changing the present operation condition of said child station into the low-power-consumption operation condition, thereby bringing both of said child station and said parent station into the low-power-consumption operations in addition to said compulsorily condition changing operation by said compulsorily condition changing means.

2. An automobile multiplex communication system as claimed in claim 1, wherein said detection means detects a variation in a voltage of a power source, caused when a supply of the voltage is instantaneously interrupted.

3. An automobile multiplex communication system as claimed in claim 2, wherein said detection means includes:

a zener diode having a zener voltage preset to a voltage lower than said voltage of the power source;

an NPN transistor, the base electrode of which is connected to the zener diode and the collector of which produces a first signal; and a PNP transistor, the base electrode of which is connected to said collector of said NPN transistor and the collector of which produces a second signal, whereby said variation in the voltage of the power source is detected by receiving both of said first signal and said second signal.

4. An automobile multiplex communication system as claimed in claim 1, wherein said compulsorily condition changing means includes at least:

an oscillator for oscillating a clock signal;

a communication controller for checking at least whether or not said operation changing instruction transmitted from said parent station corresponds to an instruction to a child station; and a sleep controller connected to at least said detection means, for compulsorily changing the present operation condition of said child station into the low-power-consumption operation condition upon receipt of said detection signal from said detection means, by interrupting the clock oscillation of said oscillator, whereby said multiplex communication system is compulsorily operated under low power consumption.

5. An automobile multiplex communication system as claimed in claim 4, wherein said communication controller includes at least:

an address setting circuit for previously setting preset address data;

an address-coincidence judging circuit for judging whether or not said preset address data is coincident with address data sent from said parent station via said communication line, to produce an address coincidence signal when address coincidence is detected; and a clock supply circuit for supplying the clock signal derived from said oscillator upon receipt of said address coincidence signal of said address coincidence judging circuit, and also for compulsorily interrupting the supply of said clock signal upon receipt of said detection signal of said detection means.

6. An automobile multiplex communication system as claimed in claim 1, further comprising:

a key switch provided within said child station, for selecting said normal communication mode and said low-power consumption communication mode with respect to said multiplex communication system.

7. An automobile multiplex communication system as claimed in claim 1, further comprising:

a switch provided for operating said child station;

wherein said means for changing is connected to said switch and changes the present operation condition of said child station into the normal communication mode when said switch is operated.

8. A multiplex communication system used in an automobile, comprising:

a parent station having at least judging means for judging whether or not a present communication mode of said multiplex communication system corresponds to one of a normal communication mode and a low-power-consumption mode;

at least one child station including:

detection means for detecting that a supply of power to said child station is briefly interrupted and thereafter recovered, thereby producing a detection signal, and compulsorily condition changing means for compulsorily changing a present operation condition of said child station into a low-power-consumption operation condition in response to said detection signal;

a communication line for mutually connecting said parent station and said child station;

a switch provided for operating said child station; and means connected for changing the present operation condition of said child station into the normal communication mode;

whereby when said judging means judges that the present communication mode of the multiplex communication system corresponds to said normal communication mode, said judging means sets operation conditions of said child station and said parent station to normal operation conditions so as to perform a communication between said child station and said parent station, and when said judging means judges that the present communication mode of the multiplex communication system corresponds to said low-power-consumption communication mode, said judging means transmits to said child station, an instruction for changing the present operation condition of said child station into the low-power-consumption operation condition, thereby bringing both of said child station and said parent station into the low-power-consumption operations in addition to said compulsorily condition changing operation by said compulsorily condition changing means.

9. An automobile multiplex communication system as claimed in claim 8, wherein said detection means detects a variation in a voltage of a power source, caused when a supply of the voltage is instantaneously interrupted.

10. An automobile multiplex communication system as claimed in claim 9, wherein said detection means includes:
   a zener diode having a zener voltage preset to a voltage lower than said voltage of the power source;
   an NPN transistor, the base electrode of which is connected to the zener diode and the collector of which produces a first signal; and
   a PNP transistor, the base electrode of which is connected to said collector of said NPN transistor and the collector of which produces a second signal, whereby said variation in the voltage of the power source is detected by receiving both of said first signal and said second signal.

11. An automobile multiplex communication system as claimed in claim 8, wherein said compulsorily condition changing means includes at least:
   an oscillator for oscillating a clock signal;
   a communication controller for checking at least whether or not said operation changing instruction transmitted from said parent station corresponds to an instruction to a child station; and
   a sleep controller connected to at least said detection means, for compulsorily changing the present operation condition of said child station into the low-power consumption operation condition upon receipt of said supply detection signal from said detection means, by interrupting the clock oscillation of said oscillator, whereby said multiplex communication system is compulsorily operated under low power consumption.

12. An automobile multiplex communication system as claimed in claim 11, wherein said communication controller includes at least:
   an address setting circuit for previously setting preset address data;
   an address coincidence judging circuit for judging whether or not said preset address data is coincident with address data sent from said parent station via said communication line, to produce an address coincidence signal when address coincidence is detected; and
   a clock supply circuit for supplying the clock signal derived from said oscillator upon receipt of said address coincidence signal of said address coincidence judging circuit, and also for compulsorily interrupting the supply of said clock signal upon receipt of said detection signal of said detection means.

13. An automobile multiplex communication system as claimed in claim 8, further comprising:
   a key switch provided within said child station, for selecting said normal communication mode and said low-power consumption communication mode with respect to said multiplex communication system.

14. An automobile multiplex communication system as claimed in claim 8, further comprising:
   a switch provided for operating said child station;
   wherein said means for changing is connected to said switch and changes the present operation condition of said child station into the normal communication mode when said switch is operated.

* * * * *